United States Patent
Mathew et al.

(10) Patent No.: US 11,393,082 B2
(45) Date of Patent: Jul. 19, 2022

(54) SYSTEM AND METHOD FOR PRODUCE DETECTION AND CLASSIFICATION

(71) Applicant: Walmart Apollo, LLC, Bentonville, AR (US)

(72) Inventors: Issac Mathew, Bangalore (IN); Pushkar Pushp, Bangalore (IN); Viraj Patel, Bangalore (IN); Emily Xavier, Bangalore (IN); Gaurav Savlani, Bangalore (IN); Venkataraja Nellore, Bangalore (IN); Rahul Agarwal, Bangalore (IN); Girish Thiruvenkadam, Bangalore (IN); Shivani Naik, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/521,741

(22) Filed: Jul. 25, 2019

(65) Prior Publication Data

US 2020/0034962 A1    Jan. 30, 2020

Related U.S. Application Data

(60) Provisional application No. 62/773,756, filed on Nov. 30, 2018.

(30) Foreign Application Priority Data

Jul. 26, 2018    (IN) .............................. 201811028178

(51) Int. Cl.
*G06T 7/00* (2017.01)
*G06K 9/62* (2006.01)
(Continued)

(52) U.S. Cl.
CPC .......... *G06T 7/0004* (2013.01); *G06K 9/6267* (2013.01); *G06N 3/0454* (2013.01);
(Continued)

(58) Field of Classification Search
CPC ......... G06T 7/0004; G06T 2207/20081; G06T 2207/20084; G06T 2207/30128; G06K 9/6267; G06K 2209/17; G06N 3/0454
See application file for complete search history.

(56) References Cited

U.S. PATENT DOCUMENTS

| 4,750,197 A | 6/1988 | Denekamp |
| 5,369,995 A | 12/1994 | Scheinbeim |

(Continued)

FOREIGN PATENT DOCUMENTS

| CA | 2469699 | 1/2016 |
| CN | 1789992 | 6/2006 |

(Continued)

OTHER PUBLICATIONS

S. Ren, K. He, R. Girshick, and J. Sun. Faster R-CNN: Towards real-time object detection with region proposal networks. In NIPS, 2015. (Year: 2015).*

(Continued)

*Primary Examiner* — Siamak Harandi
(74) *Attorney, Agent, or Firm* — Fitch, Even, Tabin & Flannery, LLP

(57) ABSTRACT

Systems, methods, and computer-readable storage media for object detection and classification, and particularly produce detection and classification. A system configured according to this disclosure can receiving, at a processor, an image of an item. The system can then perform, across multiple pre-trained neural networks, feature detection on the image, resulting in feature maps of the image. These feature maps can be concatenated and combined, then input into an (Continued)

additional neural network for feature detection on the combined feature map, resulting in tiered neural network features. The system then classifies, via the processor, the item based on the tiered neural network features.

20 Claims, 5 Drawing Sheets

(51) Int. Cl.
  *G06N 3/08* (2006.01)
  *G06N 20/20* (2019.01)
  *G06N 3/04* (2006.01)
  *G06V 20/68* (2022.01)

(52) U.S. Cl.
  CPC .............. *G06N 3/08* (2013.01); *G06N 20/20* (2019.01); *G06T 2207/20081* (2013.01); *G06T 2207/20084* (2013.01); *G06T 2207/30128* (2013.01); *G06V 20/68* (2022.01)

(56) References Cited

U.S. PATENT DOCUMENTS

| | | | |
|---|---|---|---|
| 5,621,162 A | 4/1997 | Yun |
| 5,671,362 A | 9/1997 | Cowe |
| 5,774,053 A | 6/1998 | Porter |
| 5,791,497 A | 8/1998 | Campbell |
| 5,835,012 A | 11/1998 | Wilk |
| 6,204,763 B1 | 3/2001 | Sone |
| 6,285,282 B1 | 9/2001 | Dorenbosch et al. |
| 6,294,997 B1 | 9/2001 | Paratore et al. |
| 6,296,187 B1 | 10/2001 | Shearer |
| 6,386,454 B2 | 5/2002 | Hecht |
| 6,435,002 B1 | 8/2002 | Briggs |
| 6,497,367 B2 | 12/2002 | Conzola |
| 6,549,135 B2 | 4/2003 | Singh |
| 6,600,418 B2 | 7/2003 | Francis |
| 6,624,752 B2 | 9/2003 | Klitsgaard |
| 6,779,722 B1 | 8/2004 | Mason |
| 6,847,447 B2 | 1/2005 | Ozanich |
| 6,865,516 B1 | 3/2005 | Richardson |
| 6,876,990 B2 | 4/2005 | Yamanishi |
| 6,965,871 B1 | 11/2005 | Szabo |
| 6,970,100 B2 | 11/2005 | Lovegreen |
| 6,982,640 B2 | 1/2006 | Lindsay |
| 7,004,621 B2 | 2/2006 | Roberts |
| 7,027,958 B2 | 4/2006 | Singh |
| 7,057,495 B2 | 6/2006 | Debord |
| 7,065,501 B1 | 6/2006 | Brown |
| 7,148,803 B2 | 12/2006 | Bandy |
| 7,185,810 B2 | 3/2007 | White |
| 7,245,386 B2 | 7/2007 | Philipps |
| 7,248,147 B2 | 7/2007 | DeBord |
| 7,271,720 B2 | 9/2007 | Tabe |
| 7,271,724 B2 | 9/2007 | Goyal |
| 7,287,694 B2 | 10/2007 | Banavar et al. |
| 7,298,257 B2 | 11/2007 | Suzuki |
| 7,347,361 B2 | 3/2008 | Lovett |
| 7,372,003 B2 | 5/2008 | Kates |
| 7,434,724 B2 | 10/2008 | Lane |
| 7,455,225 B1 | 11/2008 | Hadfield |
| 7,487,913 B2 | 2/2009 | Adema |
| 7,495,558 B2 | 2/2009 | Pope |
| 7,543,741 B2 | 6/2009 | Lovett |
| 7,560,013 B2 | 7/2009 | Shekarriz |
| 7,673,464 B2 | 3/2010 | Bodin |
| 7,675,424 B2 | 3/2010 | DeBord |
| 7,693,739 B2 | 4/2010 | Schmidtberg |
| 7,757,947 B2 | 7/2010 | Reznik |
| 7,769,221 B1 | 8/2010 | Shakes et al. |
| 7,775,130 B2 | 8/2010 | Harish |
| 7,792,711 B2 | 9/2010 | Swafford, Jr. |
| 7,796,038 B2 | 9/2010 | Batra |
| 7,810,720 B2 | 10/2010 | Lovett |
| 7,835,885 B2 | 11/2010 | Ben-Tzur |
| 7,937,244 B2 | 5/2011 | Kadaba |
| 7,954,712 B2 | 6/2011 | Babcock |
| 7,960,176 B2 | 6/2011 | Louvet |
| 7,967,201 B2 | 6/2011 | Bowlus |
| 7,978,060 B2 | 7/2011 | Mandava |
| 8,072,605 B2 | 12/2011 | Costa |
| 8,102,101 B2 | 1/2012 | Giurgiutiu |
| 8,112,303 B2 | 2/2012 | Eglen |
| 8,203,603 B2 | 6/2012 | Harbert |
| 8,279,065 B2 | 10/2012 | Butler |
| 8,306,871 B2 | 11/2012 | Farmer |
| 8,325,036 B1 | 12/2012 | Fuhr |
| 8,334,970 B2 | 12/2012 | Wildenbeest |
| 8,354,927 B2 | 1/2013 | Breed |
| 8,412,590 B2 | 4/2013 | Elliott |
| 8,447,665 B1 | 5/2013 | Schoenharl |
| 8,626,193 B1 | 1/2014 | Crossno |
| 8,682,760 B2 | 3/2014 | Cameo |
| 8,786,407 B2 | 7/2014 | Liu |
| 8,803,970 B2 | 8/2014 | Weisensale |
| 8,870,453 B2 | 10/2014 | Branch |
| 8,947,234 B2 | 2/2015 | Doan |
| 8,989,053 B1 | 3/2015 | Skaaksrud |
| 8,994,508 B2 | 3/2015 | Dacus |
| 9,024,755 B2 | 5/2015 | Fuhr |
| 9,030,295 B2 | 5/2015 | Allen |
| 9,031,990 B2 | 5/2015 | Scott |
| 9,218,585 B2 | 12/2015 | Gupta |
| 9,244,147 B1 | 1/2016 | Soundararajan |
| 9,275,361 B2 | 3/2016 | Meyer |
| 9,316,595 B2 | 4/2016 | Wakita |
| 9,350,734 B1 | 5/2016 | Jamshidi |
| 9,366,483 B2 | 6/2016 | Eckhoff |
| 9,443,217 B2 | 9/2016 | Iyer |
| 9,449,208 B2 | 9/2016 | Luk |
| 9,514,323 B2 | 12/2016 | Mehring |
| 9,524,648 B1 | 12/2016 | Gopalakrishnan |
| 9,557,224 B2 | 1/2017 | Eisenstadt |
| 9,569,944 B2 | 2/2017 | Barnes |
| 9,710,754 B2 | 7/2017 | Kaye |
| 9,766,114 B2 | 9/2017 | Ademe |
| 9,789,518 B2 | 10/2017 | Iino |
| 9,794,165 B1 | 10/2017 | Wood |
| 9,811,632 B2 | 11/2017 | Grabiner |
| 9,824,298 B1 | 11/2017 | Krishnan Gorumkonda |
| 9,835,498 B2 | 12/2017 | Haarer |
| 9,888,214 B2 | 2/2018 | Bateman |
| 9,915,638 B2 | 3/2018 | Pakstaite |
| 10,009,667 B2 | 6/2018 | Taylor |
| 10,060,798 B1 | 8/2018 | Riscalla |
| 10,089,556 B1* | 10/2018 | Xu ................... G06K 9/00771 |
| 10,176,451 B2 | 1/2019 | Nemet |
| 10,187,593 B2 | 1/2019 | Holmes |
| 10,223,610 B1* | 3/2019 | Akselrod-Ballin .......................... G06K 9/6273 |
| 10,281,200 B2 | 5/2019 | Johnston |
| 10,285,433 B2 | 5/2019 | Ademe |
| 10,324,439 B2 | 6/2019 | Lagares-Greenblatt |
| 10,373,472 B2 | 8/2019 | Johnston |
| 10,386,827 B2 | 8/2019 | Enver |
| 10,423,918 B2 | 9/2019 | Mehring |
| 10,445,684 B2 | 10/2019 | Mehring |
| 10,452,959 B1* | 10/2019 | Gautam ............... G06K 9/4628 |
| 10,466,111 B2 | 11/2019 | Jones |
| 10,546,162 B1 | 1/2020 | Diorio |
| 10,552,654 B2 | 2/2020 | Beckmann |
| 10,572,851 B2 | 2/2020 | Skaaksrud |
| 10,591,306 B2 | 3/2020 | High |
| 10,594,956 B2 | 3/2020 | Holmes |
| 10,676,794 B2 | 6/2020 | Amini |
| 10,956,856 B2 | 3/2021 | Ma |
| 11,070,895 B2 | 7/2021 | Taylor |
| 11,138,554 B2 | 10/2021 | Johnsen |
| 2001/0045449 A1 | 11/2001 | Shannon |
| 2002/0119513 A1 | 8/2002 | Alocilja |
| 2003/0088442 A1 | 5/2003 | Michael |
| 2003/0214387 A1 | 11/2003 | Giaccherini |
| 2004/0018641 A1 | 1/2004 | Goldsmith |

(56) References Cited

U.S. PATENT DOCUMENTS

| | | |
|---|---|---|
| 2004/0069046 A1 | 4/2004 | Sunshine |
| 2004/0074957 A1 | 4/2004 | Devar |
| 2004/0148117 A1 | 7/2004 | Kirshenbaum |
| 2004/0154739 A1 | 8/2004 | Shanahan |
| 2004/0204881 A1 | 10/2004 | Mayer |
| 2004/0226392 A1 | 11/2004 | McNally |
| 2004/0233055 A1 | 11/2004 | Canich |
| 2005/0060246 A1 | 3/2005 | Lastinger |
| 2005/0061877 A1 | 3/2005 | Stevens |
| 2005/0075954 A1 | 4/2005 | Matsumoto |
| 2005/0104730 A1 | 5/2005 | Yang |
| 2005/0149470 A1 | 7/2005 | Fujie |
| 2005/0197912 A1 | 9/2005 | Wittmer |
| 2005/0203790 A1 | 9/2005 | Cohen |
| 2005/0222889 A1 | 10/2005 | Lai |
| 2005/0228712 A1 | 10/2005 | Bornstein |
| 2006/0006987 A1 | 1/2006 | Hashimoto |
| 2006/0011721 A1 | 1/2006 | Olsen |
| 2006/0018274 A1 | 1/2006 | Twitchell |
| 2006/0071774 A1 | 4/2006 | Brown |
| 2006/0080819 A1 | 4/2006 | McAllister |
| 2006/0097875 A1 | 5/2006 | Ott |
| 2006/0171332 A1 | 8/2006 | Barnum |
| 2006/0192652 A1 | 8/2006 | Mandava |
| 2006/0238307 A1 | 10/2006 | Bauer |
| 2006/0244718 A1 | 11/2006 | Hiddink |
| 2007/0050070 A1 | 3/2007 | Strain |
| 2007/0050271 A1 | 3/2007 | Ufford |
| 2007/0064765 A1 | 3/2007 | Solie |
| 2007/0067177 A1 | 3/2007 | Martin |
| 2007/0067203 A1 | 3/2007 | Gil |
| 2007/0069867 A1 | 3/2007 | Fleisch |
| 2007/0076779 A1 | 4/2007 | Haarer |
| 2007/0156261 A1 | 7/2007 | Caldwell |
| 2007/0176773 A1 | 8/2007 | Smolander |
| 2007/0221727 A1 | 9/2007 | Reznik |
| 2008/0001752 A1 | 1/2008 | Bruns |
| 2008/0052201 A1 | 2/2008 | Bodin |
| 2008/0067227 A1 | 3/2008 | Poss |
| 2008/0073431 A1 | 3/2008 | Davis |
| 2008/0103944 A1 | 5/2008 | Hagemann |
| 2008/0186175 A1 | 8/2008 | Stern |
| 2008/0292759 A1 | 11/2008 | Palmer |
| 2008/0294488 A1 | 11/2008 | Gupta |
| 2009/0027213 A1 | 1/2009 | DeBord |
| 2009/0040063 A1 | 2/2009 | Yearsley |
| 2009/0058644 A1 | 3/2009 | French |
| 2009/0076645 A1 | 3/2009 | Ben-Tzur |
| 2009/0083054 A1 | 3/2009 | Koo |
| 2009/0119170 A1 | 5/2009 | Hammad |
| 2009/0144122 A1 | 6/2009 | Ginsberg |
| 2009/0261974 A1 | 10/2009 | Bailey |
| 2009/0322481 A1 | 12/2009 | Marr, III |
| 2010/0006646 A1 | 1/2010 | Stiller |
| 2010/0007464 A1 | 1/2010 | McTigue |
| 2010/0042369 A1 | 2/2010 | Mian |
| 2010/0065632 A1 | 3/2010 | Babcock |
| 2010/0101317 A1 | 4/2010 | Ashrafzadeh |
| 2010/0138281 A1 | 6/2010 | Zhang |
| 2010/0253504 A1 | 10/2010 | Lliteras |
| 2011/0029413 A1 | 2/2011 | Ben-Tzur |
| 2011/0035326 A1 | 2/2011 | Sholl |
| 2011/0068921 A1 | 3/2011 | Shafer |
| 2011/0301903 A1 | 12/2011 | Humbert |
| 2012/0101876 A1 | 4/2012 | Turvey |
| 2012/0161967 A1 | 6/2012 | Stern |
| 2012/0264446 A1 | 10/2012 | Xie |
| 2012/0267541 A1 | 10/2012 | Utukuri |
| 2012/0304014 A1 | 11/2012 | Prophete |
| 2012/0310853 A1 | 12/2012 | Aldstadt |
| 2013/0002443 A1 | 1/2013 | Breed |
| 2013/0117053 A2 | 5/2013 | Campbell |
| 2013/0176115 A1 | 7/2013 | Puleston |
| 2013/0214797 A1 | 8/2013 | Gruden |
| 2013/0218511 A1 | 8/2013 | Mager |
| 2013/0235206 A1 | 9/2013 | Smith |
| 2013/0282522 A1 | 10/2013 | Hassan |
| 2014/0138440 A1 | 5/2014 | D'Ambrosio |
| 2014/0146164 A1 | 5/2014 | Bajema |
| 2014/0147015 A1 | 5/2014 | Bajema |
| 2014/0180953 A1 | 6/2014 | Westcott |
| 2014/0201041 A1 | 7/2014 | Meyer |
| 2014/0294239 A1 | 10/2014 | Duckett |
| 2014/0297487 A1 | 10/2014 | Bashkin |
| 2014/0313055 A1 | 10/2014 | Warkentin |
| 2014/0316875 A1 | 10/2014 | Tkachenko |
| 2014/0330407 A1 | 11/2014 | Corder |
| 2015/0015373 A1 | 1/2015 | Mongrenier |
| 2015/0019391 A1 | 1/2015 | Kumar |
| 2015/0021401 A1 | 1/2015 | Rajagopal |
| 2015/0022313 A1 | 1/2015 | Maier |
| 2015/0041616 A1 | 2/2015 | Gentile |
| 2015/0048938 A1 | 2/2015 | Tew |
| 2015/0084100 A1 | 3/2015 | Sablong |
| 2015/0095255 A1 | 4/2015 | Hall |
| 2015/0102903 A1 | 4/2015 | Wilkinson |
| 2015/0186840 A1 | 7/2015 | Torres |
| 2015/0192475 A1 | 7/2015 | Eisenstadt |
| 2015/0245179 A1 | 8/2015 | Jarvis |
| 2015/0338846 A1 | 11/2015 | Boivin |
| 2015/0347945 A1 | 12/2015 | Reese |
| 2015/0349917 A1 | 12/2015 | Skaaksrud |
| 2016/0012337 A1 | 1/2016 | Kaye |
| 2016/0026032 A1 | 1/2016 | Moore |
| 2016/0034907 A1 | 2/2016 | Worrall |
| 2016/0048798 A1 | 2/2016 | Meyer |
| 2016/0063367 A1 | 3/2016 | Cai |
| 2016/0132821 A1 | 5/2016 | Glasgow |
| 2016/0148440 A1 | 5/2016 | Kwak |
| 2016/0171434 A1 | 6/2016 | Ladden et al. |
| 2016/0189087 A1 | 6/2016 | Morton |
| 2016/0203591 A1 | 7/2016 | Justaniah |
| 2016/0217417 A1 | 7/2016 | Ma |
| 2016/0239794 A9 | 8/2016 | Shafer |
| 2016/0260059 A1 | 9/2016 | Benjamin |
| 2016/0283904 A1 | 9/2016 | Siegel |
| 2016/0292634 A1 | 10/2016 | Mehring |
| 2016/0307040 A1 | 10/2016 | Shulman |
| 2016/0314514 A1 | 10/2016 | High |
| 2016/0350715 A1 | 12/2016 | Minvielle |
| 2016/0350756 A1 | 12/2016 | Shepard et al. |
| 2017/0039194 A1 | 2/2017 | Tschetter |
| 2017/0039511 A1 | 2/2017 | Corona |
| 2017/0059391 A1 | 3/2017 | Ademe |
| 2017/0061171 A1 | 3/2017 | Lombardi |
| 2017/0074921 A1 | 3/2017 | Uota |
| 2017/0102694 A1 | 4/2017 | Enver |
| 2017/0116565 A1 | 4/2017 | Feiner |
| 2017/0122771 A1 | 5/2017 | Keal |
| 2017/0164773 A1 | 6/2017 | Wirtz |
| 2017/0255901 A1 | 9/2017 | Bermudez Rodriguez |
| 2017/0269601 A1 | 9/2017 | Jones |
| 2017/0280351 A1 | 9/2017 | Skaaksrud |
| 2017/0286905 A1 | 10/2017 | Richardson |
| 2017/0300984 A1 | 10/2017 | Hurwich |
| 2017/0344934 A1 | 11/2017 | Millhouse |
| 2017/0344935 A1 | 11/2017 | Mattingly |
| 2018/0039853 A1* | 2/2018 | Liu .................... G06K 9/72 |
| 2018/0045700 A1 | 2/2018 | Biermann |
| 2018/0078992 A1 | 3/2018 | High |
| 2018/0096175 A1 | 4/2018 | Schmeling |
| 2018/0137642 A1 | 5/2018 | Malisiewicz et al. |
| 2018/0143131 A1 | 5/2018 | Choi |
| 2018/0144300 A1 | 5/2018 | Wiechers |
| 2018/0144430 A1 | 5/2018 | Millhouse |
| 2018/0150684 A1* | 5/2018 | Wang .................... G06K 9/6256 |
| 2018/0180492 A1 | 6/2018 | Ribi |
| 2018/0181838 A1* | 6/2018 | Yang .................... G06K 9/4619 |
| 2018/0195869 A1 | 7/2018 | High |
| 2018/0211208 A1 | 7/2018 | Winkle |
| 2018/0217118 A1 | 8/2018 | Payne |
| 2018/0242768 A1 | 8/2018 | Lewis |
| 2018/0247257 A1 | 8/2018 | Johng |
| 2018/0270631 A1 | 9/2018 | High |

(56) References Cited

U.S. PATENT DOCUMENTS

| | | | |
|---|---|---|---|
| 2018/0279023 A1 | 9/2018 | Taylor | |
| 2018/0290809 A1 | 10/2018 | Espinosa | |
| 2018/0315011 A1 | 11/2018 | Clarke | |
| 2019/0073770 A1* | 3/2019 | Moradi | G06K 9/6267 |
| 2019/0147396 A1 | 5/2019 | Bohling | |
| 2019/0223643 A1 | 7/2019 | Hara | |
| 2019/0285603 A1 | 9/2019 | Velez | |
| 2020/0085290 A1* | 3/2020 | Wang | G06N 3/08 |
| 2020/0118072 A1 | 4/2020 | Johnson | |
| 2020/0160497 A1 | 5/2020 | Shah | |
| 2020/0242402 A1* | 7/2020 | Jung | G06K 9/6232 |
| 2020/0275010 A1 | 8/2020 | Bohling | |
| 2021/0398065 A1 | 12/2021 | Johnsen | |
| 2022/0010160 A1 | 1/2022 | Zhong | |

FOREIGN PATENT DOCUMENTS

| | | | |
|---|---|---|---|
| CN | 201314907 | | 9/2009 |
| CN | 202306566 | | 7/2012 |
| CN | 102930649 | | 2/2013 |
| CN | 203275285 | | 11/2013 |
| CN | 203306566 | | 11/2013 |
| CN | 103543703 | | 1/2014 |
| CN | 103593746 | A | 2/2014 |
| CN | 104036354 | | 9/2014 |
| CN | 204010264 | | 12/2014 |
| CN | 104749329 | | 7/2015 |
| CN | 204514846 | | 7/2015 |
| CN | 105444504 | | 3/2016 |
| CN | 106408173 | | 2/2017 |
| CN | 106600286 | | 4/2017 |
| CN | 107703269 | | 2/2018 |
| EP | 1221613 | | 7/2002 |
| EP | 1374688 | | 1/2004 |
| EP | 2165298 | | 3/2010 |
| EP | 2509412 | A1 | 10/2012 |
| EP | 2835078 | A1 | 2/2015 |
| GB | 2256708 | A * | 12/1992 ... G06T 7/0004 |
| JP | 2002195971 | A | 7/2002 |
| JP | 2008004133 | A | 1/2008 |
| JP | 2013068547 | | 4/2013 |
| WO | 2000078919 | A1 | 12/2000 |
| WO | 2001023256 | | 4/2001 |
| WO | 2003098175 | | 11/2003 |
| WO | 2007052208 | A1 | 5/2007 |
| WO | 2008006152 | A1 | 1/2008 |
| WO | 2008147897 | | 12/2008 |
| WO | 2009147821 | A1 | 12/2009 |
| WO | 2012125960 | | 9/2012 |
| WO | 2013174983 | | 11/2013 |
| WO | 2014059048 | | 4/2014 |
| WO | 2015061429 | | 4/2015 |
| WO | 2015066594 | | 5/2015 |
| WO | 2020023762 | | 1/2020 |

OTHER PUBLICATIONS

Andrew Wilson, "Vision Software Blends into Food Processing", Jun. 1, 2012, pp. 1-13.

Cognex, "Introduction to Machine vision, A guide to automating process & quality improvements", pp. 1-24.

S. Mandal et al., "Optimal production inventory policy for defective items with fuzzy time period", Science Direct, Applied Mathematical modelling, vol. 34, Issue 3, Mar. 2010, pp. 1-27.

International Search Report and Written Opinion dated Nov. 4, 2019 in corresponding International Application No. PCT/US2019/043461.

3M; "3M MonitorMark Time Temperature Indicators"; https://www.3m.com/3M/en_US/company-US/all-3m-products/~/MONMARK-3M-MonitorMark-Time-Temperature-lndicators/? N=5002385+3293785721&rt=rud; Available at least as early as Feb. 7, 2019; pp. 1-4.

Agrofresh; "FreshCloud™ Storage Insights helps you monitor fruit in storage for added peace of mind"; https://www.agrofresh.com/technologies/freshcloud/storage-insights/; Available at least as early as Feb. 7, 2019; pp. 1-4.

Ahearn, Brianna; "Kroger Wins For Food Temperature Innovation"; https://www.retailsupplychaininsights.com/doc/kroger-wins-for-food-temperature-innovation-0001; Jun. 4, 2015; pp. 1-2.

Ambrosus; "Decentralised IoT Networks for Next-Generation Supply Chains"; https://ambrosus.com/#home; Available at least as early as Feb. 7, 2019; pp. 1-12.

Anzilotti, Eillie; "These High-Tech Sensors Track Exactly How Fresh Our Produce Is So We Stop Wasting Food"; https://www.fastcompany.com/40424163/these-high-tech-sensors-track-exactly-how-fresh-our-produce-is-so-we-stop-wasting-food; May 26, 2017; pp. 1-3.

Arah, Isaac Kojo et al.; "Preharvest and Postharvest Factors Affecting the Quality and Shelf Life of Harvested Tomatoes: A Mini Review"; http://downloads.hindawi.com/journals/ija/2015/478041.pdf; Available as early as Oct. 14, 2015; pp. 1-7.

Badia, Ricardo; "Cold Chain Logistics: Assessing the Challenge"; https://www.zestlabs.com/assessing-cold-chain-logistics/; Mar. 19, 2019; pp. 1-4.

Barthe, J.F.; "D.2.3.2. Database of consumer awareness, expectations and concerns on cold chain"; http://www.frisbee-project.eu/images/result/FRISBEE_DEL_2-3-2.pdf; Dec. 2, 2011; pp. 1-26.

Barthe, J.F.; "D.2.3.2.1 Survey questionnaires and materials for studies of consumer perspectives and attitudes towards refrigerated foods, the cold chain and relevant refrigeration technologies (Informed consent forms, privacy, personal data handling)"; http://www.frisbee-project.eu/images/result/FRISBEE_DEL_2-3-2-1.pdf; Feb. 8, 2012; pp. 1-21.

Bedard, Jean; "Temperature Mapping of Storage Areas"; Technical supplement to WHO Technical Report Series, No. 961, 2011; WHO Press, World Health Organization; available at least as early as Jan. 2014; pp. 1-25.

Bevan et al.; "Storage of Organically Produced Crops"; https://orgprints.org/8241/1/Storage_organic_produce_report.pdf; Dec. 1997; pp. 1-227.

Bogataj, M., et al.; "Stability of perishable goods in cold logistic chains"; International Journal of Production Economics, vol. 93-94; 2005; pp. 345-356.

BT9 Intelligent Supply Chain Solutions; "Multi Segment, Real Time, Cold Chain Perishable Information"; http://www.bt9-tech.com; Published 2018; pp. 1-6.

Business Wire; "Emerson Expands Global Capabilities in Fresh Food Monitoring with Acquisitions of Locus Traxx and PakSense"; https://www.businesswire.com/news/home/20160830005136/en/Emerson-Expands-Global-Capabilities-Fresh-Food-Monitoring; Aug. 30, 2016; pp. 1-2.

Cao, Jordan; "Intelligent Container—powered by Sap Hana"; https://blogs.saphana.com/2018/09/27/intelligent-container-powered-sap-hana/; Sep. 27, 2018; pp. 1-5.

Capgemini; "Schuitema Revolutionizes Food Quality Control Through RFID"; https://www.capgemini.com/se-en/wp-content/uploads/sites/29/2017/07/Schuitema_Revolutionizes_Food_Quality_Control_Through_RFID.pdf; Jul. 29, 2017; pp. 1-2.

Carrefour Group; "Carrefour launches Europe's first food blockchain"; http://www.carrefour.com/current-news/carrefour-launches-europes-first-food-blockchain; Mar. 6, 2018; pp. 1-2.

Chainlink Research; "Achieving Consistent Product Quality"; https://www.zestlabs.com/wp-content/uploads/2016/12/Quality-Management-For-Produce.pdf; Available as early as Dec. 2016; pp. 1-8.

Chainlink Research; "Measuring Produce Freshness: The Key to Preventing Waste"; https://www.zestlabs.com/wp-content/uploads/2016/03/Measuring-Produce-Freshness.pdf; Available as early as Mar. 2016; pp. 1-12.

Chainlink Research; "Preemptive Freshness Management"; https://www.zestlabs.com/wp-content/uploads/2017/03/Preemptive-Freshness-Management.pdf; Available as early as Mar. 2017; pp. 1-8.

Chainlink Research; "Blockchain's Role in the Produce Supply Chain"; https://www.zestlabs.com/wp-content/uploads/2018/01/Blockchains-Role-in-the-Produce-Supply-Chain.pdf; Available as early as Jan. 2018; pp. 1-20.

(56) References Cited

OTHER PUBLICATIONS

Chainlink Research; "Pallet-level Monitoring"; https://www.zestlabs.com/wp-content/uploads/2016/03/Pallet-Monitoring-for-the-Fresh-Food-Supply-Chain.pdf; Available as early as Mar. 2016; pp. 1-9.

Chainlink Research; "Why Quality Consistency Matters"; https://www.zestlabs.com/wp-content/uploads/2016/03/Why-Food-Supply-Chain-Quality-Matters-1.pdf; Available as early as Mar. 2016; pp. 1-10.

Claussen, Ingrid C.; "Deliverable D.3.2.4.3 Literature review and experimental data of chilled, superchilled/supercooled fish quality and safety models"; http://www.frisbee-project.eu/images/result/FRISBEE_DEL_3-2-4-3.pdf; May 6, 2011; pp. 1-29.

Colmer, Christian; "Chill—ON! Transparent food quality all the way"; https://www.innovations-report.com/html/reports/medicine-health/chill-transparent-food-quality-168201.html; Oct. 1, 2011; pp. 1-5.

Compact.Net; "Inspection Planning / Quality Inspection / SPC / LIMS"; https://www.caq.de/en/Software/InspectionPlanning_QualityInspection_SPC; available at least as early as Jan. 27, 2017; pp. 1-4.

Cotillon, C.; "Deliverable 8.2.1.1 Publication in Scientific Journals"; http://www.frisbee-project.eu/images/result/FRISBEE_DEL_8.2.1.1.pdf; Oct. 27, 2011; pp. 1-5.

Cotillon, C.; "Deliverable 8.3.3.1 Mini conferences"; http://www.frisbee-project.eu/images/result/FRISBEE_DEL_8.3.3.1.pdf; Dec. 7, 2011; pp. 1-8.

Cotillon, C.; "Deliverable 8.6.1 Report on collaboration with other EU projects"; http://www.frisbee-project.eu/images/result/FRISBEE_DEL_8.6.1.pdf; Dec. 5, 2011; pp. 1-12.

Dada, Ali, et al.; "Sensor Applications in the Supply Chain: The Example of Quality-Based Issuing of Perishables"; The Internet of Things. Lecture Notes in Computer Science, edited by Christian Floerkemeier, et al.; vol. 4952; 2008; pp. 140-154.

De Troch, Stefan; "Item-level cold chain monitoring, another cool NFC solution"; https://blog.nxp.com/internet-of-things-2/item-level-cold-chain-monitoring-another-cool-nfc-solution; Aug. 30, 2016; pp. 1-5.

Desmedt, Frederique; "Deliverable 8.1.1 Project logo, Leaflet and PowerPoint presentation"; http://www.frisbee-project.eu/images/result/FRISBEE_DEL_8.1.1.pdf; Nov. 19, 2010; pp. 1-30.

Desmedt, Frederique; "Deliverable 8.1.2 Project internet and intranet website"; http://www.frisbee-project.eu/images/result/FRISBEE_DEL_8.1.2.pdf; Mar. 3, 2011; pp. 1-9.

DIGI; "Digi Honeycomb Keeping food safe just got easier and cheaper. Digi Honeycomb lets you monitor your entire Cold Chain System"; https://s3.amazonaws.com/telusdigital-marketplace-production/iot/user-content/product/64aa-o.pdf; Available at least as early as Feb. 7, 2019; pp. 1-2.

Dji Ferntech; "Drones For Agriculture"; https://www.djistore.co.nz/agriculture; Available at least as early as Feb. 7, 2019; pp. 1-13.

Do Nascimento Nunes, M. C., et al.; "Improvement in fresh fruit and vegetable logistics quality: berry logistics field studies"; Philosophical Transactions of the Royal Society; http://dx.doi.org/10.1098/rsta.2013.0307; 2014; pp. 1-19.

Doyle, John P.; "Seafood Shelf Life as a Function of Temperature"; Alaska Sea Grant Marine Advisory Program; No. 30; 1989; pp. 1-6.

Ecoark Holdings, Inc.; "Ocean Mist Farms Selects Zest Fresh to Optimize Freshness Management"; https://www.globenewswire.com/news-release/2018/12/04/1661680/0/en/Ocean-Mist-Farms-Selects-Zest-Fresh-to-Optimize-Freshness-Management.html; Dec. 4, 2018; pp. 1-3.

Emerson; "ProAct Services and ProAct Transport"; https://www.emerson.com/en-US/commercial-residential/proact; Available at least as early as Feb. 7, 2019; pp. 1-4.

Emerson; "Real-Time Temperature & Location Trackers"; https://climate.emerson.com/en-US/products/controls-monitoring-systems/cargo-tracking-monitoring/trackers; Available at least as early as Feb. 7, 2019; pp. 1-4.

Emerson; "Supply Chain Data Loggers"; https://climate.emerson.com/en-US/products/controls-monitoring-systems/cargo-tracking-monitoring/loggers; Available at least as early as Feb. 7, 2019; pp. 1-4.

EOM, Ki-Hwan, et al.; "The Meat Freshness Monitoring System Using the Smart RFID Tag"; International Journal of Distributed Sensor Networks, vol. 2014; http://journals.sagepub.com/doi/10.1155/2014/591812; Jul. 9, 2014; pp. 1-10.

Evans, J.; "Deliverable D2.2.2 : Assessment of current refrigeration technologies of selected food industries and their potential improvement in current refrigeration"; http://www.frisbee-project.eu/images/result/FRISBEE_DEL_2-2-2.pdf; Jan. 30, 2012; pp. 1-181.

Evans, Judith et al.; "Deliverable D.2.2.3 : Analysis of potential of novel refrigeration technologies suitable for selected industries for application and improvement of food quality, energy consumption and environmental impact"; http://www.frisbee-project.eu/images/result/FRISBEE_DEL_2-2-3.pdf; Dec. 2, 2011; pp. 1-54.

Fast Casual; "Wireless temperature-monitoring, tracking solution available for shipping perishable goods"; https://www.fastcasual.com/news/wireless-temperature-monitoring-and-tracking-solution-now-available-for-shipping-perishable-goods/; Aug. 15, 2017; pp. 1-10.

Food and Agriculture Organization of the United Nations; "Flying robots for food security"; http://www.fao.org/zhc/detail-events/en/c/428256; Aug. 10, 2016; pp. 1-3.

Freshai; "AI-powered waste reduction for smart food businesses."; http://freshai.farmsteadapp.com/; Available as early as Feb. 7, 2019; pp. 1-5.

FreshFruitPortal.Com; "Zest Labs fights food waste by routing pallets according to real-time freshness"; https://www.freshfruitportal.com/news/2018/07/19/technology-zest-labs-food-waste-profits-sensors; Jul. 19, 2018; pp. 1-5.

Friedlos, Dave; "New Zealand Kiwifruit Processor Finds ROI"; https://www.rfidjournal.com/articles/view?4090; May 20, 2008; pp. 1-4.

Friedman, Phil; "AI, machine learning, and more efficient routing"; https://www.omnitracs.com/blog/ai-machine-learning-and-more-efficient-routing; Jun. 28, 2018; pp. 1-6.

Frisbee; "Frisbee european project—Archive"; https://web.archive.org/web/20180815100417/http://www.frisbee-project.eu/archive-results.html; Available as early as Aug. 15, 2018; pp. 1-5.

Frisbee; "Frisbee european project—Developing novel breakthrough technologies"; https://web.archive.org/web/20180316101206/http://www.frisbee-project.eu/research/92-developing-novel-breakthrough-technologies.html; Available as early Mar. 16, 2018; pp. 1-3.

Frisbee; "Frisbee european project—FRISBEE at the Sixteenth Conference on Food Microbiology, Belgium"; http://www.frisbee-project.eu/news/40-frisbee-at-the-sixteenth-conference-on-food-microbiology.html; Nov. 15, 2011; pp. 1-1.

Frisbee; "Frisbee european project—FRISBEE develops a Virtual Platform application"; http://www.frisbee-project.eu/news/90-frisbee-develops-a-virtual-platform-application.html; Mar. 18, 2013; pp. 1-1.

Frisbee; "Frisbee european project—FRISBEE dissemination activities"; http://www.frisbee-project.eu/news/91-frisbee-dissemination-activities.html; Mar. 18, 2013; pp. 1-1.

Frisbee; "Frisbee european project—FRISBEE on the starting-blocks"; http://www.frisbee-project.eu/news/49-frisbee-on-the-starting-blocks.html; Mar. 9, 2012; pp. 1-2.

Frisbee; "Frisbee european project—FRISBEE welcomes New Members Advisory Board"; http://www.frisbee-project.eu/news/48-new-members-advisory-board.html; Mar. 9, 2012; pp. 1-1.

Frisbee; "Frisbee european project—FRISBEE: Latest Developments"; http://www.frisbee-project.eu/news/42-frisbee-project-latest-developments.html; Dec. 21, 2011; pp. 1-2.

Frisbee; "Frisbee european project—Join the first European Food Cold Chain Database!!!";http://www.frisbee-project.eu/news/55-database2.html; Jul. 9, 2012; pp. 1-2.

FRISBEE; "Frisbee european project - Magnetic refrigeration technology. FRISBEE'S experts team work on this disruptive technology"; https://web.archive.org/web/20180316101206/http://www.

(56) References Cited

OTHER PUBLICATIONS frisbee-project.eu/research/51-magnetic-refrigeration-technology. html; Available as early as Mar. 16, 2018; pp. 1-3.
FRISBEE; "Frisbee european project - MEP-scientist pairing scheme"; http://www.frisbee-project.eu/news/41-mep-scientist-pairing-scheme. html; Dec. 20, 2011; pp. 1-2.
FRISBEE; "Frisbee european project - Nanoparticles, a concentrate of energy: PCM nanoparticles where low temperatures are needed"; https://web.archive.Org/web/20180316101206/http://www.frisbee-project.eu/research/27-nanoparticles-a-concentrate-of-energy.html; Available as early as Mar. 16, 2018; pp. 1-2.
FRISBEE; "Frisbee european project - Project Overview"; https://web.archive.org/web/20120211082956/http://www.frisbee-project.eu/project-overview.html; Available as early as Feb. 11, 2012; pp. 1-1.
FRISBEE; "Frisbee european project - Saving energy by refrigeration predictive control"; https://web.archive.org/web/20180316101206/http://www.frisbee-project. eu/research/52-saving-energy-by-refrigeration-predictive-control.html; Available as early as Mar. 16, 2018; pp. 1-3.
FRISBEE; "Frisbee european project - Superchilling! A new technology to have your food products fresher than fresh"; https://web.archive.org/web/20180316101206/http://www.frisbee-project.eu/research/50-superchilling.html; Available as early as Mar. 16, 2018; pp. 1-3.
FRISBEE; "Frisbee european project - Taking Europe's temperature: Cold chain database"; http://www.frisbee-project.eu/news/89-taking-europe-%E2%80%99s-temperature-cold-chain-database. html; Mar. 18, 2013; pp. 1-2.
FRISBEE; "Frisbee european project - Workpackages"; https://web.archive.org/web/20120210124516/http://www.frisbee-project.eu/workpackages.html; Available as early as Feb. 10, 2012; pp. 1-2.
FRISBEE; "Simulate a cold chain"; https://frisbee-etool.irstea.fr; Available as early as 2020; pp. 1-3.
Gabbett, Rita Jane; "Amazon using artificial intelligence to monitor food safety issues"; http://www.micausa.org/amazon-using-artificial-intelligence-monitor-food-safety-issues/; May 9, 2018; pp. 1-3.
Gapud, Veny; "Food Safety Trends Exploring Implications of Mandatory Safety Standards in Retail and Foodservice"; https://www.foodsafetymagazine.com/magazine-archive1/december-2009january-2010/food-safety-trends-exploring-implications-of-mandatory-safety-standards-in-retail-and-foodservice/; Dec. 12, 2019; pp. 1-20.
Gaukler, Gary et al.; "Establishing Dynamic Expiration Dates for Perishables: An Application of RFID and Sensor Technology"; International Journal of Production Economics; vol. 193; Jul. 25, 2017; pp. 617-632.
GEIE/CEMA/ITP; "Deliverable D 8.3.1.3 Newsletter edited by GEIE for industrial use N°3"; http://www.frisbee-project.eu/images/result/FRISBEE_DEL_8.3.1.3.pdf; Mar. 13, 2012; pp. 1-10.
GEIE/CEMA/ITP; "Deliverable D8.3.1.2 Newsletter edited by GEIE for industrial use N°2"; http://www.frisbee-project.eu/images/result/FRISBEE_DEL_8.3.1.2.pdf; Oct. 27, 2011; pp. 1-10.
Giannakourou, M. C., et al.; "Application of a TTI-Based Distribution Management System for Quality Optimization of Frozen Vegetables at the Consumer End"; Journal of Food Science, vol. 68, Issue 1; Jan. 2003; pp. 201-209.
Grand View Research; "Cold Chain Market Size Worth $447.50 Billion By 2025 | CAGR: 15.1%"; https://www.grandviewresearch.com/press-release/global-cold-chain-market; Mar. 2019; pp. 1-10.
Greenwalt, Megan; "Acquisition Leads to New, Fresh Food Waste Solution"; https://www.waste360.com/mergers-and-acquisitions/acquisition-leads-new-fresh-food-waste-solution; Aug. 15, 2018; pp. 1-6.
Greis, Noel R; "Monitoring the 'Cool Chain' Maximizing Shelf Life for Safer Food"; https://atecentral.net/r20093/case_study_monitoring_the_cool_chain; National Science Foundation; published on Dec. 2011; pp. 1-9.
Haard, Norman F., et al.; "Characteristics of Edible Plant Tissues"; Food Chemistry, edited by Owen R. Fennema; 3rd Ed.; Marcel Dekker, Inc.; 1996; pp. 943-1011.
Hagen, Christian et al.; "A Fresh Look: Perishable Supply Chains Go Digital"; https://www.atkearney.co m/operations-performance-transformation/article?/a/a-fresh-look-perishable-supply-chains-go-digital; Available at least as early as Feb. 7, 2019; pp. 1-22.
Harvard Business Review; "How Blockchain Will Accelerate Business Performance and Power the Smart Economy"; https://hbr.org/sponsored/2017/10/how-blockchain-will-accelerate-business-performance-and-power-the-smart-economy; Oct. 27, 2017; pp. 1-8.
Haugen, John E., et al.; "Application of gas-sensor array technology for detection and monitoring of growth of spoilage bacteria in milk: A model study"; Analytica Chimica Acta; vol. 565, No. 1; https://doi.Org/10.1016/j.aca.2006.02.016; Feb. 23, 2006; pp. 10-16.
Hertog, M. L. A. T. M., et al.; "Shelf-life modelling for first-expired-first-out warehouse management"; Philosophical Transactions of the Royal Society; http://dx.doi.org/10.1098/rsta.2013.0306; 2014; pp. 1-15.
Hsu, Jenny W; "Freshippo Customers Can Track Farm-To-Shelf Journey for Food"; https://www.alizila.com/hema-food-tracking/; Aug. 7, 2018; pp. 1-6.
Husseini, Talal; "Walmart's 'Eden' artificial intelligence technology to inspect fresh food for spoilage"; https://www.foodprocessing-technology.com/news/walmarts-eden-artificial-intelligence-technology-inspect-fresh-food-spoilage; Mar. 2, 2018; pp. 1-4.
IBM; "Dhl Breaks New Ground with RFID-Based Real-Time Tracking of Sensitive Shipments"; ftp://ftp.software.IBM.com/software/solutions/pdfs/ODC00298-USEN-00.pdf; Available as early as Mar. 2007; pp. 1-4.
IBM; "Take your food data further with Fresh Insights for IBM Food Trust"; https://www.IBM.com/blockchain/solutions/food-trust/freshness; Available at least as early as Feb. 7, 2019; pp. 1-3.
IBM; "Focus On Food Safety"; https://www.IBM.com/downloads/cas/ZN9EWKRQ; Available at least as early as 2018; pp. 1-2.
IMPACTVISION; "Non-invasive, real time food quality information"; https://www.impactvi.com; Available at least as early as Feb. 7, 2019; pp. 1-18.
IMPINJ; "Hy-Vee Grocery Automates Cold Chain Monitoring"; https://www.impinj.com/library/customer-stories/hy-vee-cold-chain-monitoring-increases-shelf-life/; Available as early as Feb. 7, 2019; pp. 1-3.
INFRATAB; "Products"; https://infratab.com/products/; Available at least as early as Feb. 7, 2019; pp. 1-2.
INFRATAB; "Infratab Freshtime RF Sensor Blockchain Solutions for the Fresh Seafood Cold Chain"; https://web.aimg lobal.org/external/wcpages/wcecommerce/eComItemDetailsPage.aspx?ItemID=656; 2019; pp. 1-5.
INTEL; "Intelligent Dynamic Store Merchandising Solution Cuts Losses on Perishables and Raises Brand Awareness"; Available at least as early as Feb. 7, 2019; pp. 1-12.
IQATEAM; "Material Inspection Using a Cloud Software"; http://Mqalims.com/wp-content/uploads/2015/02/MAT_INSP.pdf; available at least as early as Jan. 27, 2017; pp. 1-5.
Jedermann, Reiner, et al.; "Semi-passive RFID and Beyond: Steps Towards Automated Quality Tracing in the Food Chain"; Inderscience Enterprises Ltd.; Int. J. Radio Frequency Identification Technology and Applications, vol. 1, No. 3; published in 2007; pp. 247-259.
Jedermann, Reiner, et al.; "Communication techniques and challenges for wireless food quality monitoring"; Philosophical Transactions of the Royal Society; http://dx.doi.org/10.1098/rsta.2013.0304; 2014; pp. 1-18.
Jedermann, Reiner, et al.; "Reducing food losses by intelligent food logistics"; Philosophical Transactions of the Royal Society; http://dx.doi.org/10.1098/rsta.2013.0302; 2014; pp. 1-20.
Kader, A. A.; "Pre- and Postharvest Factors Affecting Fresh Produce Quality, Nutritional Value, and Implications for Human Health"; Proceedings of the International Congress of Food Production and the Quality of Life, Sassari (Italy) Sep. 4-8, 2000, vol. 1, pp. 109-119.
Kader, Adel A., et al.; "Technologies to Extend the Refrigerated Shelf Life of Fresh Fruit"; Food Storage Stability, edited by Irwin A. Taub, et al.; Boca Raton; CRC Press; 1998; pp. 1-27.

(56) References Cited

OTHER PUBLICATIONS

Kader, Adel A.; "Postharvest Technology of Horticultural Crops"; 2002; 3rd Ed.; University of California Agriculture and Natural Resources; Oakland; 56 pages.
Kader, Adel A.; "Postharvest Technology of Horticultural Crops"; 2002; 3rd Ed.; University of California Agriculture and Natural Resources; Oakland; 74 pages.
Kader, Adel A.; "Postharvest Technology of Horticultural Crops"; 2002; 3rd Ed.; University of California Agriculture and Natural Resources; Oakland; pp. 113-196.
Kader, Adel A.; "Postharvest Technology of Horticultural Crops"; 2002; 3rd Ed.; University of California Agriculture and Natural Resources; Oakland; pp. 197-250.
Kader, Adel A.; "Postharvest Technology of Horticultural Crops"; 2002; 3rd Ed.; University of California Agriculture and Natural Resources; Oakland; pp. 251-314.
Kader, Adel A.; "Postharvest Technology of Horticultural Crops"; 2002; 3rd Ed.; University of California Agriculture and Natural Resources; Oakland; pp. 315-384.
Kader, Adel A.; "Postharvest Technology of Horticultural Crops"; 2002; 3rd Ed.; University of California Agriculture and Natural Resources; Oakland; pp. 385-434.
Kader, Adel A.; "Postharvest Technology of Horticultural Crops"; 2002; 3rd Ed.; University of California Agriculture and Natural Resources; Oakland; pp. 435-480.
Kader, Adel A.; "Postharvest Technology of Horticultural Crops"; 2002; 3rd Ed.; University of California Agriculture and Natural Resources; Oakland; pp. 67-112.
Ketzenberg, M., et al.; "Expiration Dates and Order Quantities for Perishables"; European Journal of Operational Research; vol. 266, Issue 2; Apr. 2018; pp. 569-584.
Ketzenberg, M., et al.; "Managing Perishables with Time and Temperature History"; Production and Operations Management; vol. 24, Issue 1; Jan. 2015; pp. 54-70.
Ketzenberg, M., et al.; "The Value of RFID Technology Enabled Information to Manage Perishables"; https://pdfs.semanticscholar.org/bded/16af2e689b4fdcea7f8421f6e012a6041324.pdf; Apr. 2009; pp. 1-37.
Kong, F. et al.; "Chemical Deterioration and Physical Instability of Foods and Beverages"; The Stability and Shelf Life of Food, edited by Persis Subramaniam; 2nd Ed.; Woodhead Publishing; 2016; pp. 1-21.
Koutsoumanis, K., et al.; "Development of a safety monitoring and assurance system for chilled food product"; International Journal of Food Microbiology, vol. 100; 2005; pp. 253-260.
KROGER; "Kroger Gets HarvestMark Allows consumers to trace the origin of salads"; https://www.cspdailynews.com/foodservice/kroger-gets-harvestmark; Oct. 29, 2009; pp. 1-11.
Labuza, T. P., et al.; "The Relationship Between Processing and Shelf Life"; Foods for the '90s, edited by Gordon G. Birch, et al.; Elsevier Applied Science; Aug. 1, 1990; pp. 1-21.
Leake, Linda L.; "The Search for Shelf Life Solutions"; https://www.ift.org/news-and-publications/food-technology-magazine/issues/2007/november/columns/laboratory?page=viewall; Nov. 1, 2007; pp. 1-8.
Marvin, Rob; "Blockchain: The Invisible Technology That's Changing the World"; https://in.pcmag.com/amazon-web-services/112363/blockchain-the-invisible-thats-changing-the-world; Aug. 30, 2017; pp. 1-29.
Mazur, Michal; "Six Ways Drones Are Revolutionizing Agriculture"; https://www.technologyreview.com/s/601935/six-ways-drones-are-revolutionizing-agriculture; Jul. 20, 2016; pp. 1-5.
McBeath, Bill; "Winning the Freshness Wars: Creating Shopper Loyalty and Improving Profitability in Retail Grocery"; https://www.zestlabs.com/wp-content/uploads/2016/11/ZL_WP_FreshnessWars_060415.pdf; Available as early as Feb. 2013; pp. 1-16.
Mehring, Peter; "Blockchain for Food Safety-Addressing the Challenges"; https://www.zestlabs.com/will-blockchain-solve-food-safety-challenges/; Sep. 26, 2018; pp. 1-4.
Mehring, Peter; "Zest Labs CEO Peter Mehring on the Walmart Lawsuit"; https://www.zestlabs.com/zest-labs-ceo-peter-mehring-walmart-lawsuit/; Aug. 1, 2018; pp. 1-4.
MIPSIS; "Quality Control Inspection Software"; http://www.mipsis.com/QualityInspectionSoftware.html; available at least as early as Jan. 27, 2017; pp. 1-3.
Mitrokotsa et al.; "Integrated RFID and Sensor Networks: Architectures and Applications"; https://pdfs.semanticscholar.org/e5b0/c2a44971bad209cbf66afb6c825f89792723.pdf; Jun. 22, 2009; pp. 511-536.
Moorthy, Rahul et al.; "On-Shelf Availability in Retailing"; vol. 116 - No. 23; International Journal of Computer Applications; Apr. 2015; pp. 47-51.
Musani, Parvez; "Eden: The Tech That's Bringing Fresher Groceries to You"; https://blog.walmart.com/innovation/20180301/eden-the-tech-thats-bringing-fresher-groceries-to-you; Mar. 1, 2018; pp. 1-4.
My Devices; "Alibaba Cloud and myDevices Partner to Launch Turnkey IoT Solutions in China"; https://mydevices.com/newspost/alibaba-cloud-mydevices-partner-launch-turnkey-iot-solutions-china/; Sep. 11, 2018; pp. 1-3.
National Geographic Society, Season, Sep. 22, 2016 (Year: 2016).
NBC Bay Area; "Tech Company Helps Inspect Food During Shutdown"; https://www.nbcbayarea.com/news/tech/tech-company-helps-inspect-food-during-shutdown_bay-area/4851; Jan. 11, 2019; pp. 1-6.
NRDC; "Wasted: How America is Losing up to 40 Percent of Its Food From Farm to Fork Landfill"; https://www.nrdc.org/sites/default/files/wasted-2017-report.pdf; Available as early as Aug. 2017; pp. 1-58.
Opatova, H.; "Deliverable 8.2.2.1 Organisation of a Workshop in Prague 2011 at International Congress of Refrigeration"; http://www.frisbee-project.eu/images/result/FRISBEE_DEL_8.2.2.1 .pdf; Oct. 27, 2011; pp. 1-8.
Oracle; "Oracle Unveils Business-Ready Blockchain Applications"; https://www.oracle.com/nz/corporate/pressrelease/oow18-oracle-blockchain-applications-cloud-2018-10-23.html; Oct. 23, 2018; pp. 1-4.
Palanza, Rich; "IoT Monitoring: Rapidly Deliver on the Promise of IoT"; https://business.weather.com/blog/iot-monitoring-rapidly-deliver-on-the-promise-of-iot; May 16, 2018; pp. 1-4.
Payne, Kevin;" New Verizon Ad Sheds Light on Important Food Safety Issues"; https://www.zestlabs.com/new-verizon-ad-sheds-light-on-important-food-safety-issues/; Dec. 15, 2017; pp. 1-4.
Payne, Kevin; "Agriculture Technology and "The Messy Middle'; https://www.zestlabs.com/agriculture-technology-messy-middle/; Jun. 25, 2019; pp. 1-4.
Payne, Kevin; "Are You Ready to Make 2018 Your Best Year Ever?" https://www.zestlabs.com/are-you-ready-to-make-2018-your-best-year-ever/; Feb. 13, 2018; pp. 1-4.
Payne, Kevin; "Blockchain for Fresh Food Supply Chains—Reality Sets In?"; https://www.zestlabs.com/blockchain-fresh-supply-chains-reality/; May 7, 2019; pp. 1-4.
Payne, Kevin; "Cold Chain Visibility: Who's Winning the Freshness Wars?"; https://www.zestlabs.com/cold-chain-visibility-freshness-wars/; Apr. 9, 2019; pp. 1-4.
Payne, Kevin; "Cold Supply Chain Variability—The Impact of Delays"; https://www.zestlabs.com/cold-supply-chain-variability/; Apr. 23, 2019; pp. 1-4.
Payne, Kevin; "Earth Day 2019 and Looking Ahead to 2020"; https://www.zestlabs.com/earth-day-2019/; Apr. 30, 2019; pp. 1-4.
Payne, Kevin; "Finding the Right Tools: Can Blockchain and IOT Fix the Fresh Food Supply Chain?—Register for the Webinar"; https://www.zestlabs.com/finding-the-right-tools-can-blockchain-and-iot-fix-the-fresh-food-supply-chain-register-for-the-webinar/; Feb. 27, 2018; pp. 1-4.
Payne, Kevin; "Food Grower And Supplier Challenges: The Top 10"; https://www.zestlabs.com/food-growers-suppliers-challenges/; Feb. 19, 2019; pp. 1-4.
Payne, Kevin; "Food Labelsand Food Waste—A Solution"; https://www.zestlabs.com/food-labels-food-waste/; Mar. 12, 2019; pp. 1-4.

(56) References Cited

OTHER PUBLICATIONS

Payne, Kevin; "Food Safety Tips: Three Things to Consider"; https://www.zestlabs.com/food-safety-tips-three-things-to-consider/; Jul. 2, 2019; pp. 1-4.
Payne, Kevin; "Fresh Produce and Health: What's the Connection?"; https://www.zestlabs.com/fresh-produce-health-interrelationship/; Apr. 2, 2019; pp. 1-4.
Payne, Kevin; "Grocery Shopper Trends 2019: Key Insights"; https://www.zestlabs.com/grocery-shopper-trends-2019-key-insights/; Jul. 23, 2019; pp. 1-4.
Payne, Kevin; "How to Feed a Hungry Planet: Food for Thought"; https://www.zestlabs.com/feed-a-hungry-planet/; Aug. 6, 2019; pp. 1-4.
Payne, Kevin; "Hyped Up? Blockchain and Why a Hybrid Model is Best"; https://www.zestlabs.com/hyped-up-blockchain-the-fresh-food-supply-chain-and-why-a-hybrid-model-is-best/; Jan. 30, 2018; pp. 1-4.
Payne, Kevin; "I'll Never Look at Strawberries the Same Way"; https://www.zestlabs.com/ill-never-look-at-strawberries-the-same-way/; Dec. 15, 2017; pp. 1-4.
Payne, Kevin; "Improving Operational Efficiency: TQM for the Fresh Food Supply Chain"; https://www.zestlabs.com/improving-operational-efficiency-deming-drucker/; Aug. 27, 2019; pp. 1-4.
Payne, Kevin; "Increasing Trucking Costs Further Squeezes Grocery Margins - Don't Waste Your Money!" https://www.zestlabs.com/increasing-trucking-costs-further-squeezes-grocery-margins-dont-waste-your-money/; Feb. 6, 2018; pp. 1-4.
Payne, Kevin; "IoT Sensors and Reducing Food Waste"; https://www.zestlabs.com/iot-sensors-reduce-food-waste/; Feb. 12, 2019; pp. 1-4.
Payne, Kevin; "Millennials Want True Transperency"; https://www.zestlabs.com/millennials-want-true-transparency/; Jan. 9, 2018; pp. 1-4.
Payne, Kevin; "Myth Busting: Produce Shrink is Caused at the Store"; https://www.zestlabs.com/myth-busting-produce-shrink-occurs-at-the-store/; Feb. 20, 2018; pp. 1-4.
Payne, Kevin; "New Zest Fresh for Produce Modules: Rapid Implementations and Faster ROI"; https://www.zestlabs.com/zest-fresh-produce-modules/; Jul. 10, 2019; pp. 1-4.
Payne, Kevin; "Online Grocery Shopping Options Abound But..."; https://www.zestlabs.com/online-grocery-shopping/; Feb. 5, 2019; pp. 1-4.
Payne, Kevin; "Preventing Food Waste: Multiple Approaches"; https://www.zestlabs.com/preventing-food-waste-multiple-approaches/; Jul. 16, 2019; pp. 1-4.
Payne, Kevin; "Proactive Food Safety: Moving the Industry Forward"; https://www.zestlabs.com/proactive-food-safety/; Aug. 13, 2019; pp. 1-4.
Payne, Kevin; "Produce Marketing: Brandstorm Offers A Wealth Of Insights"; https://www.zestlabs.com/produce-marketing-ideas; Feb. 26, 2019; pp. 1-4.
Payne, Kevin; "Reducing Fresh Food Waste: Addressing the Problem"; https://www.zestlabs.com/reducing-fresh-food-waste-problem/; Mar. 5, 2019; pp. 1-4.
Payne, Kevin; "Rethinking Food Safety and the Supply Chain"; https://www.zestlabs.com/rethinking-food-safety-supply-chain/; May 14, 2019; pp. 1-5.
Payne, Kevin; "Salad Kits: How to Ensure Freshness"; https://www.zestlabs.com/salad-kits-fresh/; Apr. 16, 2019; pp. 1-4.
Payne, Kevin; "Shelf-life Variability at Grocery Stores: Half-bad is Not Good"; https://www.zestlabs.com/shelf-life-variability-among-leading-grocery-stores/; Jun. 10, 2019; pp. 1-4.
Payne, Kevin; "Start the Year Fresh!" https://www.zestlabs.com/start-the-year-fresh/; Jan. 16, 2018; pp. 1-4.
Payne, Kevin; "Supply Chain Waste: Can We Fix the Problem? (Yes)"; https://www.zestlabs.com/supply-chain-waste/; Jul. 30, 2019; pp. 1-5.
Payne, Kevin; "Sustainability and the Supply Chain"; https://www.zestlabs.com/sustainability-supply-chain/; Jun. 18, 2019; pp. 1-4.
Payne, Kevin; "Sustainability or Greenwashing" https://www.zestlabs.com/sustainability-or-greenwashing/; Jan. 23, 2018; pp. 1-4.
Payne, Kevin; "The "Best If Used By" Date Label: Will It Reduce Food Waste?"; https://www.zestlabs.com/best-if-used-by-date-label/; Jun. 4, 2019; pp. 1-4.
Payne, Kevin; "The Emergence of Brand Marketing in Produce"; https://www.zestlabs.com/brand-marketing-produce/; Aug. 20, 2019; pp. 1-4.
Payne, Kevin; "The Grocery Shopping Experience: Fresh Foods, Fresh Ideas"; https://www.zestlabs.com/grocery-shopping-experience-fresh-foods/; May 21, 2019; pp. 1-4.
Payne, Kevin; "To Use or Not to Use - What's Up With Date Labels" https://www.zestlabs.com/date-label/; Jan. 2, 2018; pp. 1-4.
Payne, Kevin; "Want to Improve Your Grocery Margins? Take a Look at Your Supply Chain"; https://www.zestlabs.com/want-to-improve-your-grocery-margins-take-a-look-at-your-supply-chain/; Dec. 19, 2017; pp. 1-4.
Payne, Kevin; "World Hunger Day 2019: Sustainability"; https://www.zestlabs.com/world-hunger-day-2019-sustainability/; May 28, 2019; pp. 1-4.
Payne, Kevin; "Your Technology Roadmap for Digital Transformation"; https://www.zestlabs.com/technology-roadmap/; Mar. 26, 2019; pp. 1-4.
Payne, Kevin; "A Picture Is Worth..."; https://www.zestlabs.com/a-picture-is-worth/; Apr. 3, 2018; pp. 1-4.
Payne, Kevin; "Before and After - The Benefits of Digital Transformation"; https://www.zestlabs.com/benefits-digital-transformation/; Jan. 29, 2019; pp. 1-5.
Payne, Kevin; "Being Proactive: What We Can Learn from Football"; https://www.zestlabs.com/being-proactive-learn-from-football/; Jul. 17, 2018; pp. 1-4.
Payne, Kevin; "Digital Transformation Technology: Is It Finally Time?"; https://www.zestlabs.com/digital-transformation-technology/; Aug. 7, 2018; pp. 1-4.
Payne, Kevin; "Experience the Many Benefits of Family Meals"; https://www.zestlabs.com/benefits-family-meals/; Sep. 3, 2019; pp. 1-4.
Payne, Kevin; "First Principles Thinking and the Fresh Food Supply Chain"; https://www.zestlabs.com/first-principles-thinking/; Oct. 2, 2018; pp. 1-4.
Payne, Kevin; "Five Days? The Causes of Shelf-life Variability"; https://www.zestlabs.com/five-days-shelf-life-variability/; Nov. 20, 2018; pp. 1-4.
Payne, Kevin; "Food Service Delivery: This Isn't What I Ordered!"; https://www.zestlabs.com/isnt-what-ordered/; Aug. 28, 2018; pp. 1-4.
Payne, Kevin; "Food Spoilage: The Impact On Your Business"; https://www.zestlabs.com/food-spoilage-impact-business/; Jan. 15, 2019; pp. 1-4.
Payne, Kevin; "Food Sustainability Goals: Noble But Are They Viable?"; https://www.zestlabs.com/food-sustainability-goals/; Aug. 14, 2018; pp. 1-4.
Payne, Kevin; "Fresh Food Industry Trends 2019 - Our Predictions"; https://www.zestlabs.com/fresh-food-industry-trends-2019/; Jan. 2, 2019; pp. 1-4.
Payne, Kevin; "Fresh Food Industry Trends from 2018"; https://www.zestlabs.com/fresh-food-industry-trends-2018/; Dec. 11, 2018; pp. 1-4.
Payne, Kevin; "Fresh Food Sustainability - It's More Than Field to Fork"; https://www.zestlabs.com/fresh-food-sustainability/; Jan. 22, 2019; pp. 1-4.
Payne, Kevin; "Freshness Capacity: Strawberries Are Like Your Cell Phone..."; https://www.zestlabs.com/your-fresh-strawberries-are-like-your-cellphone/; Jul. 10, 2018; pp. 1-4.
Payne, Kevin; "Grocers Are Applying Artificial Intelligence"; https://www.zestlabs.com/grocers-turning-artificial-intelligence/; Oct. 9, 2018; pp. 1-4.
Payne, Kevin; "Growers And Suppliers - What Really Happens In The Food Supply Chain"; https://www.zestlabs.com/what-happens-fresh-food-supply-chain/; Apr. 24, 2018; pp. 1-5.
Payne, Kevin; "Improving Post-Harvest Operational Efficiency"; https://www.zestlabs.com/improving-operational-efficiency/; Sep. 18, 2018; pp. 1-4.

(56) References Cited

OTHER PUBLICATIONS

Payne, Kevin; "Is Your Fresh Food Supply Chain Stuck In The '60s?"; https://www.zestlabs.com/is-your-fresh-food-supply-chain-stuck-in-the-60s/; Mar. 13, 2018; pp. 1-4.
Payne, Kevin; "It's (Past) Time for Freshness Management"; https://www.zestlabs.com/managing-fresh-food-shelf-life/; Nov. 27, 2018; pp. 1-4.
Payne, Kevin; "It's Like Waze For The Fresh Food Supply Chain"; https://www.zestlabs.com/waze-fresh-food-supply-chain/; Apr. 10, 2018; pp. 1-5.
Payne, Kevin; "Let's Celebrate National Salad Month!"; https://www.zestlabs.com/lets-celebrate-national-salad-month/; May 1, 2018; pp. 1-4.
Payne, Kevin; "Let's Start At The Beginning"; https://www.zestlabs.com/lets-start-at-the-beginning/; May 15, 2018; pp. 1-4.
Payne, Kevin; "Margins Matter - Don't Get Squeezed"; https://www.zestlabs.com/6931-2/; Apr. 17, 2018; pp. 1-4.
Payne, Kevin; "Perishable Food Waste Cuts Profits & Raises Greenhouse Gases"; https://www.zestlabs.com/food-waste-profits-greenhouse-gases/; Sep. 11, 2018; pp. 1-4.
Payne, Kevin; "Pma Fresh Summit 2018-Wow!"; https://www.zestlabs.com/pma-fresh-summit/; Oct. 23, 2018; pp. 1-4.
Payne, Kevin; "PMA's Fresh Summit: Eat Up!"; https://www.zestlabs.com/pma-fresh-summit-2018/; Oct. 16, 2018; pp. 1-4.
Payne, Kevin; "Poor Quality Produce: Never Going Back Again"; https://www.zestlabs.com/never-going-back-again/; Jul. 3, 2018; pp. 1-4.
Payne, Kevin; "Premature Food Spoilage: Uh Oh, It's the Fuzz!"; https://www.zestlabs.com/uh-oh-its-the-fuzz/; Jun. 19, 2018; pp. 1-4.
Payne, Kevin; "Produce Shelf Life Extenders and Fresh Food Waste"; https://www.zestlabs.com/shelf-life-extenders-food-waste/; Nov. 13, 2018; pp. 1-4.
Payne, Kevin; "Refed: Committed to Reducing U.S. Food Waste"; https://www.zestlabs.com/refed-committed-reducing-waste/; Oct. 30, 2018; pp. 1-4.
Payne, Kevin; "Romaine Lettuce Labeling - Zest Fresh Can Help"; https://www.zestlabs.com/romaine-lettuce-labeling/; Dec. 4, 2018; pp. 1-4.
Payne, Kevin; "Saving Money Day 1 - Invest $1, Get $9 Back"; https://www.zestlabs.com/saving-money-day-1/; Novembers, 2018; pp. 1-4.
Payne, Kevin; "September Is National Family Meals Month"; https://www.zestlabs.com/september-family-meals-month/; Sep. 4, 2018; pp. 1-4.
Payne, Kevin; "Shelf-life Variability in Produce: The Five Causes"; https://www.zestlabs.com/shelf-life-variability-produce-five-causes/; Jan. 8, 2019; pp. 1-4.
Payne, Kevin; "Solving the Problem of Fresh Produce Waste"; https://www.zestlabs.com/solving-problem-fresh-food-waste/; Dec. 18, 2018; pp. 1-4.
Payne, Kevin; "Stay Cool! (And Visit US at United Fresh!)"; https://www.zestlabs.com/stay-cool-and-visit-US-at-united-fresh/; Jun. 5, 2018; pp. 1-4.
Payne, Kevin; "Stop Doing That!"; https://www.zestlabs.com/stop-doing-that/; May 29, 2018; pp. 1-4.
Payne, Kevin; "Supply Chain Performance: The Fox and the Henhouse"; https://www.zestlabs.com/fox-hen-house/; Jun. 26, 2018; pp. 1-4.
Payne, Kevin; "The Fresh Food Industry and Charles Darwin"; https://www.zestlabs.com/charles-darwin-fresh-food-industry/; Aug. 21, 2018; pp. 1-4.
Payne, Kevin; "The Game of (Shelf) Life"; https://www.zestlabs.com/game-shelf-life/; Sep. 25, 2018; pp. 1-4.
Payne, Kevin; "Timing Is Everything - The Impact Of Cut-To-Cool Time On Freshness"; https://www.zestlabs.com/timing-is-everything-the-impact-of-cut-to-cool-time-on-freshness/; May 8, 2018; pp. 1-5.
Payne, Kevin; "What to do to Build Grocery Store Loyalty?"; https://www.zestlabs.com/grocery-store-loyalty/; Jul. 24, 2018; pp. 1-4.
Payne, Kevin; "What? No. Bacon? (Cue Ominous Music)"; https://www.zestlabs.com/what-No. bacon-cue-ominous-music/; Mar. 6, 2018; pp. 1-5.
Payne, Kevin; "What's In The Bag?"; https://www.zestlabs.com/whats-in-the-bag/; May 22, 2018; pp. 1-4.
Payne, Kevin; "Where's The Beef (Been)?"; https://www.zestlabs.com/wheres-the-beef-been/; Mar. 27, 2018; pp. 1-5.
Payne, Kevin; "Zest Labs Offers Fresh Wishes for the New Year"; https://www.zestlabs.com/zest-labs-fresh-wishes-new-year/; Dec. 24, 2018; pp. 1-4.
PCT; App No. PCT/US2017/046044; International Search Report and Written Opinion mailed Oct. 19, 2017.
PCT; App No. PCT/US2018/14236; International Search Report and Written Opinion mailed Apr. 17, 2018.
PCT; PCT App. No. PCT/US17/33959; International Search Report and Written Opinion mailed on 2017-08-25; Atty Docket 8842-138334-WO.
Peterson, Hayley; "Walmart is saving $2 billion with a machine called 'Eden' that inspects food and knows when it will spoil"; https://www.businessinsider.in/walmart-is-saving-2-billion-with-a-machine-called-eden-that-inspects-food-and-knows-when-it-will-spoil/articleshow/631 27641 .cms; Mar. 1, 2018; pp. 1-12.
PRIDEVEL; "IoT Cold Chain Monitoring"; http://www.pridevel.com/sap-iot-cold-chain-monitoring; Available at least as early as Feb. 7, 2019; pp. 1-3.
QA; "Carrefour and SGS Launch Visual Trust in China"; https://www.qualityassurancemag.com/article/carrefour-and-sgs-launch-visual-trust-in-china/; Sep. 28, 2017; pp. 1-4.
Qc One; "Inspect. Report. Analyze. Quality Control Software for Fresh Produce"; http://qcone.com/en/; available at least as early as May 29, 2017; pp. 1-2.
ReFED; "A Roadmap to Reduce U.S. Food Waste by 20 Percent"; https://www.refed.com/downloads/ReFED_Report_2016.pdf; 2016; pp. 1-96.
ReFED; "Restaurant Food Waste Action Guide"; https://www.refed.com/downloads/Restaurant_Guide_Web.pdf; 2018; pp. 1-44.
ReFED; "Retail Food Waste Action Guide"; https://www.refed.com/downloads/Retail_Guide_Web.pdf; 2018; pp. 1-44.
Ripple News Tech Staff; "Alibaba is Using Blockchain to Improve Consumer Confidence and Fight Food Fraud"; https://ripplenews.tech/2018/05/03/alibaba-is-using-blockchain-to-improve-consumer-confidence-and-fight-food-fraud/; May 3, 2018; pp. 1-7.
Robertson, Gordon L.; "Food Packaging: Principles and Practice"; 3rd Ed.; Boca Raton; CRC Press; 2013; pp. 1-33.
Ruiz-Garcia, Luis et al.; "Monitoring Cold Chain Logistics by Means of RFID"; http://cdn.intechweb.org/pdfs/8493.pdf; Feb. 1, 2010; pp. 1-16.
Ryan, John M.; "Guide to Food Safety and Quality During Transportation: Controls, Standards and Practices"; Academic Press; available at least as early as 2014; pp. 1-8.
Ryan, John; "Why Blockchain Will Be Used to Improve Distribution Food Safety, Quality, and Traceability"; https://www.foodsafetymagazine.com/enewsletter/why-blockchain-will-be-used-to-improve-distribution-food-safety-quality-and-traceability/; Feb. 5, 2019; pp. 1-3.
Scalco, Dan; "5 Ways to Ensure Meals Stay Fresh and Safe in Transit"; https://www.zestlabs.com/meals-stay-fresh-safe-transit/; Jun. 12, 2018; pp. 1-4.
Scotto Di Tella, F.; "Deliverable D8.3.1.1 Newsletter edited by GEIE for industrial use N°1"; http://www.frisbee-project.eu/images/result/FRISBEE_DEL_8.3.1.1.pdf; May 6, 2011; pp. 1-9.
SENSEFLY; "Why Use Agriculture Drones?"; https://www.sensefly.com/industry/agricultural-drones-industry; Available at least as early as Feb. 7, 2019; pp. 1-15.
SENSEGROW; "Supply Chain Monitoring with Real-time IoT Platform"; http://www.sensegrow.com/blog/supply-chain-monitoring; May 10, 2018; pp. 1-5.
Shacklett, Mary; "Customer Retention and Growth in Today's Competitive Retail Grocery Environment"; https://www.zestlabs.com/downloads/Food-Freshness-and-Customer-Satisfaction-Transworld-Research-Apr. 2019.pdf; Apr. 2019; pp. 1-7.

(56) References Cited

OTHER PUBLICATIONS

Shacklett, Mary; "Improving Profits and Operational Efficiency on the Farm"; https://www.zestlabs.com/downloads/Improving-Operational-Efficiency-on-the-Farm-Transworld-Research-2018.pdf; Available as early as 2018; pp. 1-6.
Shacklett, Mary; "Optimizing Profit Margins in a Changing Retail Grocery Industry"; https://www.zestlabs.com/downloads/Optimizing-Profit-Margins-Transworld.pdf; 2018; pp. 1-10.
Siawsolit, Chokdee et al.; "The Value of Demand Information in Omni-Channel Grocery Retailing"; https://www.researchgate.net/publication/331048136_The_Value_of_Demand_Information_in_Omni-Channel_Grocery_Retailing; Available as early as Jan. 2019; pp. 1-11.
Singh, R. P.; "Scientific Principles of Shelf-Life Evaluation"; Shelf-Life Evaluation of Foods, edited by Dominic Man, et al.; 2nd Ed.; Aspen Publishers, Inc.; 2000; pp. 1-23.
Singh, R. Paul et al.; "Introduction to Food Engineering"; 5th Ed.; Academic Press; 2014; pp. 1-31.
Smart Sense; "Supermarket Remote Monitoring Solutions"; https://www.smartsense.co/industries/retail/supermarkets; Available at least as early as Feb. 7, 2019; pp. 1-6.
SMILO; "The latest generation hybrid blockchain platform"; https://smilo.io/files/Smilo_White_Paper_V1.8.1.pdf; Available at least as early as Feb. 7, 2019; pp. 1-33.
Softexpert; "Se Inspection Incoming/Outgoing Goods Inspection and Supplier Management"; https://softexpert.com/inspection-evaluation-goods.php; available at least as early as Jan. 27, 2017; pp. 1-3.
Springer, Jon; "Walmart, Kroger join suppliers in blockchain food safety initiative"; https://www.supermarketnews.com/news/walmart-kroger-join-suppliers-blockchain-food-safety-initiative; Aug. 22, 2017; pp. 1-4.
Stahl, Valerie et al.; "Deliverable D.3.2.4.2 Literature review and experimental data of chilled and frozen meat quality and safety models"; http://www.frisbee-project.eu/images/result/FRISBEE_DEL_3.2.4.2.pdf; Jun. 6, 2011; pp. 1-28.
Sunny George, Gwanpua; "Deliverable D3.2.4.1 Literature review and experimental data of chilled apple quality models"; http://www.frisbee-project.eu/images/result/FRISBEE DEL 3.2.4.1.pdf; Mar. 1, 2011; pp. 1-24.
Swedberg, Claire; "DOD Considers RFID-based Solutions for Tracking Food's Shelf Life"; https://www.rfidjournal.com/articles/pdf711423; Feb. 11, 2014; pp. 1-3.
Swedberg, Claire; "Researchers Seek to Reduce Wastage for First-Strike Rations"; https://www.rfidjournal.com/articles/pdf79162; Jan. 26, 2012; pp. 1-4.
Swedberg, Claire; "Schuitema Ponders Future of Fresh-Chain Pilot"; https://www.rfidjournal.com/articles/pdf73793; Dec. 10, 2007; pp. 1-4.
Swedberg, Claire; "Starbucks Keeps Fresh with RFID"; https://www.rfidjournal.com/articles/view?2890; Dec. 13, 2006; pp. 1-1.
Taoukis, P. S., et al.; "Applicability of Time-Temperature Indicators as Shelf Life Monitors of Food Products"; Journal of Food Science; vol. 54, Issue 4; Jul. 1989; pp. 783-788.
Taoukis, P. S., et al.; "Use of time-temperature integrators and predictive modelling for shelf life control of chilled fish under dynamic storage conditions"; International Journal of Food Microbiology, vol. 53; 1999; pp. 21-31.
Taoukis, Petros et al.; "Deliverable D.2.1.2 Temperature monitoring techniques and traceability systems along the cold chain";http://www.frisbee-project.eu/images/result/FRISBEE_DEL_2%201%202.pdf; Jul. 26, 2011; pp. 1-28.
Taoukis, Petros; "Deliverable D 3.2.4.4 Literature review and experimental data of frozen milk products and vegetables quality models"; http://www.frisbee-project.eu/images/result/FRISBEE_DEL_3-2-4-4.pdf; Jun. 6, 2011; pp. 1-24.
TCS Worldwide; "TCS Cargo Monitoring Solution: Track freshness of perishable cargo"; https://www.tcs.com/cargo-monitoring-solution; Available at least as early as Feb. 7, 2019; pp. 1-7.

Te-Food; "Te-Food Partners with Halal Trail Bringing Halal Food Companies to the Blockchain"; https://www.reuters.com/brandfeatures/venture-capital/article?id=38153; May 31, 2018; pp. 1-6.
Tech Mahindra; "Cold Chain Monitoring"; https://www.techmahindra.com/services/NextGenSolutions/DES/Solutions/ColdChainMonitoring.aspx; Available at least as early as Feb. 7, 2019; pp. 1-4.
Tech Mahindra; "Farm to fork"; https://www.techmahindra.com/services/NextGenSolutions/DES/Solutions/Farm_to_fork.aspx; Available at least as early as Feb. 7, 2019; pp. 1-2.
TEIJIN—Human Chemistry, Human Solutions, Teijin's RFID Smart Shelf-Management System Used for Mass Document Management. Retrieved online at: http://www.teijin.com/news/2014/ebd140307_11.html. 2 pages, Mar. 7, 2014.
The NeWave® Smart Inventory Managment System: Take Your Management to the Next Level, NeWave Sensor Solutions Innovation Center, Oct. 7, 2016; pp. 1-2.
This New World By Huffpost; "Eating Ugly: The Food Waste That Could Refeed America"; https://www.facebook.com/ThisNewWorldHuffPost/videos/428476821288487; Apr. 22, 2019; pp. 1-9.
Tive; "A Complete Supply Chain Visibility System"; https://tive.co/product; Available at least as early as Feb. 7, 2019; pp. 1-7.
Tive; "Environmental Monitoring for Perishables"; https://tive.co/solution/environmental-monitoring-for-perishables/; Available at least as early as Feb. 7, 2019; pp. 1-5.
Traqtion; "TraQtion's Supply Chain Solution Manages Global Food Supplier Compliance and Audits"; https://www.traqtion.com/documents/TraQtion-Costco.pdf; Available as early as Feb. 7, 2019; pp. 1-2.
Trimble; "Trimble Acquires HarvestMark to Provide Food Traceability and Quality Control"; https://www.prnewswire.com/news-releases/trimble-acquires-harvestmark-to-provide-food-traceability-and-quality-control-300070050.html; Apr. 22, 2015; pp. 1-6.
Trust in Food™; "Sustainability Research Report 2019"; https://www.zestlabs.com/downloads/Trust-In-Food-Sustainability-Survey-2019.pdf; Available as early as Jul. 18, 2019; pp. 1-19.
Tsenso; "The Fresh Index: A Real-Time Shelf Life Indicator"; https://tsenso.com/en/freshindex-instead-of-bestbefore; Available at least as early as Feb. 7, 2019; pp. 1-5.
UKIPO; App. No. 1711034.7; Examination Report dated Feb. 20, 2020.
United States Army Medical Command; "U.S. Army Veterinary Command Guidelines and Procedures"; https://www.dla.mil/Portals/104/Documents/TroopSupporf/Subsistence/Rations/qapubs/medcom/40-13.pdf; Feb. 13, 2006; pp. 1-171.
Verigo; "Introducing Pod Quality Continuous Product Life Data, From Farm to Store"; https://www.farmtoforkfresh.com/; Available at least as early as Feb. 7, 2019; pp. 1-8.
Wageningen Ur Food & Biobased Research; "Food & Biobased Research"; https://www.worldfoodinnovations.com/userfiles/documents/FBR%20Corporate%20Brochure.pdf; Jul. 2014; pp. 1-24.
Wells, John H. et al.; "Quality Management During Storage and Distribution"; Food Storage Stability, edited by Irwin A. Taub, et al.; Boca Raton; CRC Press; 1998; pp. 1-29.
Wells, John H., et al.; "A Kinetic Approach to Food Quality Prediction using Full-History Time-Temperature Indicators"; Journal of Food Science; vol. 53, Issue 6; Nov. 1988; pp. 1866-1871.
Wells, John H., et al.; "A Quality-Based Inventory Issue Policy For Perishable Foods"; Journal of Food Processing & Preservation; vol. 12, Issue 4; Jan. 1989; pp. 271-292.
Wells, John H., et al.; "Temperature Tolerance of Foods during Distribution"; Handbook of Food Engineering Practice, edited by Kenneth J. Valentas, et al.; Boca Raton; CRC Press; 1997; pp. 1-29.
Wells, John H., et al.; "The Application of Time-Temperature Indicator Technology to Food Quality Monitoring and Perishable Inventory Management"; Mathematical Modelling of Food Processing Operations, edited by Stuart Thorne; Elsevier Applied Science; 1992; pp. 1-41.
Wells, John Henry, et al.; "Application of Time-Temperature Indicators in Monitoring Changes in Quality Attributes of Perishable and Semiperishable Foods"; Journal of Food Science; vol. 53, Issue 1; Jan. 1988; pp. 148-152, 156.
Weston, L.A et al.; "Preharvest Factors Affecting Postharvest Quality of Vegetables"; HortScience; vol. 32(5), Aug. 1997, pp. 812-816.

(56) References Cited

OTHER PUBLICATIONS

Whelan, Jenny; "Kelsius To Install FoodCheck Monitoring System In Supervalu And Centra Stores"; https://www.checkout.ie/kelsius-signs-deal-to-put-foodcheck-monitoring-system-in-supervalu-and-centra-stores/; Aug. 6, 2015; pp. 1-4.
Williamson, Katie et al.; "Climate Change Needs Behavior Change"; https://www.zestlabs.com/downloads/2018-CCNBC-Report.pdf; 2018; pp. 1-22.
Wynne-Jones, Stephen; "Maxima Group Unveils Electronic Nose' To Track Freshness"; https://www.esmmagazine.com/maxima-group-unveils-elecrtronic-nose-track-freshness/29589; Jul. 5, 2016; pp. 1-4.
XINFIN; "Enterprise Ready Hybrid Blockchain for Global Trade and Finance"; https://www.xinfin.org; Available at least as early as Feb. 7, 2019; pp. 1-13.
Yan, Lu, et al.; "The Internet of Things: From RFID to the Next-Generation Pervasive Networked Systems"; Auerbach Publications; New York; available at least as early as 2008; pp. 1-35.
Yiannas, Frank; "How Walmart's SPARK Keeps Your Food Fresh"; https://blog.walmart.com/sustainability/20150112/how-walmarts-spark-keeps-your-food-fresh; Jan. 12, 2015; pp. 1-16.
Zelem, Mc.; "Deliverable D.2.3.1 National legal and ethical requirements forthe surveys"; http://www.frisbee-project.eu/images/result/FRISBEE_DEL_2.3.1 .pdf; Jun. 23, 2011; pp. 1-68.
*Zest Labs, Inc.* v *Walmart* ; Bohling, Joshua; "Transcript of the Testimony of Bohling, Joshua"; Bushman Court Reporting; Case No. 4:18-CV-00500-JM; Aug. 15-16, 2019; pp. 5-6, 47-48, 52-69, 78, 80-82, 85, 87, 98-102, 107-134, 137-145, 158-163, 182-184, 209-210, 233-234, 239-242, 246, and 357.
*Zest Labs, Inc.* v *Walmart* ; Dickinson, Q. Todd; "Expert Report of Q. Todd Dickinson"; United States District Court forthe Eastern District of Arkansas; Case No. 4:18-CV-00500-JM; Oct. 29, 2019; pp. 1-33.
*Zest Labs, Inc.* v *Walmart* ; ECF No. 002; Zest Labs, Inc. et al.; "Motion for Leave To File Complaint Under Sealand To Establish Briefing Schedule Relating To Potentially Confidential Information in Complaint"; United States District Court for the Eastern District of Arkansas; Case No. 4:18-CV-00500-JM; Aug. 1, 2018; pp. 1-4.
*Zest Labs, Inc.* v *Walmart* ; ECF No. 003; Zest Labs, Inc. et al.; "Brief in Support of Motion for Leave To File Complaint Under Sealand To Establish Briefing Schedule Relating To Potentially Confidential Information Complaint"; United States District Court forthe Eastern District of Arkansas; Case No. 4:18-CV-00500-JM; Aug. 1, 2018; pp. 1-4.
*Zest Labs, Inc.* v *Walmart* ; ECF No. 035; Walmart; "Defendant'S Response To Plaintiffs' Motion for Leave To File Complaint Under Seal"; United States District Court forthe Eastern District of Arkansas; Case No. 4:18-CV-00500-JM; Aug. 27, 2018; pp. 1-3.
*Zest Labs, Inc.* v *Walmart* ; ECF No. 038; Zest Labs, Inc. et al.; "Plaintiffs' Reply in Support of Plaintiffs' Motion for Leave To File Complaint Under Seal"; United States District Court forthe Eastern District of Arkansas; Case No. 4:18-CV-00500-JM; Aug. 31, 2018; pp. 1-3.
*Zest Labs, Inc.* v *Walmart* ; ECF No. 041; Walmart; "Defendant'S Motion for Leave To File Under Seal"; United States District Court for the Eastern District of Arkansas; Case No. 4:18-CV-00500-JM; Sep. 4, 2018; pp. 1-3.
*Zest Labs, Inc.* v *Walmart* ; ECF No. 098; Walmart; "Defendant'S Brief in Support of Its Motion for Protective Order and To Compel Identification of Alleged Trade Secrets"; United States District Court forthe Eastern District of Arkansas; Case No. 4:18-CV-00500-JM; Feb. 11, 2019; pp. 1-29.
*Zest Labs, Inc.* v *Walmart* ; ECF No. 101-01; Sammi, P. Anthony; "Exhibit A"; United States District Court forthe Eastern District of Arkansas; Case No. 4:18-CV-00500-JM; Feb. 15, 2019; pp. 1-3.
*Zest Labs, Inc.* v *Walmart* ; ECF No. 101-02; Tulin, Edward L.; "Exhibit B"; United States District Court forthe Eastern District of Arkansas; Case No. 4:18-CV-00500-JM; Feb. 15, 2019; pp. 1-4.
*Zest Labs, Inc.* v *Walmart* ; ECF No. 101-03; Tulin, Edward L.;" Exhibit C"; United States District Court forthe Eastern District of Arkansas; Case No. 4:18-CV-00500-JM; Feb. 15, 2019; pp. 1-5.
*Zest Labs, Inc.* v *Walmart* ; ECF No. 101 -04; Zest Labs, Inc. et al.; "Exhibit D Filed Under Seal Pursuant To Order Dated Sep. 7, 2018"; United States District Court forthe Eastern District of Arkansas; Case No. 4:18-CV-00500-JM; Feb. 15, 2019; 1 page.
*Zest Labs, Inc.* v *Walmart* ; ECF No. 101-05; Zest Labs, Inc. et al.; "Exhibit E Filed Under Seal Pursuant To Order Dated Sep. 7, 2018"; United States District Court forthe Eastern District of Arkansas; Case No. 4:18-CV-00500-JM; Feb. 15, 2019; 1 page.
*Zest Labs, Inc.* v *Walmart* ; ECF No. 101; Zest Labs, Inc. et al.; "Plaintiffs' Brief in Opposition To Defendant'S Motion for Protective Order and To Compel Identification of Trade Secrets"; United States District Court for the Eastern District of Arkansas; Case No. 4:18-CV-00500-JM; Feb. 15, 2019; pp. 1-28.
*Zest Labs, Inc.* v *Walmart* ; ECF No. 102-01; Zest Labs, Inc. et al.; "Exhibit A"; United States District Court forthe Eastern District of Arkansas; Case No. 4:18-CV-00500-JM; Feb. 20, 2019; pp. 1-28.
*Zest Labs, Inc.* v *Walmart* ; ECF No. 102-02; Walmart; "Exhibit B"; United States District Court forthe Eastern District of Arkansas; Case No. 4:18-CV-00500-JM; Feb. 20, 2019; pp. 1-59.
*Zest Labs, Inc.* v *Walmart* ; ECF No. 102-03; Zest Labs, Inc. et al.; "Exhibit C Filed Under Seal"; United States District Court forthe Eastern District of Arkansas; Case No. 4:18-CV-00500-JM; Feb. 20, 2019; 1 page.
*Zest Labs, Inc.* v *Walmart* ; ECF No. 102-04; Walmart; "Exhibit D"; United States District Court forthe Eastern District of Arkansas; Case No. 4:18-CV-00500-JM; Feb. 20, 2019; pp. 1-10.
*Zest Labs, Inc.* v *Walmart* ; ECF No. 102-06; Zest Labs, Inc. et al.; "Exhibit F Filed Under Seal"; United States District Court forthe Eastern District of Arkansas; Case No. 4:18-CV-00500-JM; Feb. 20, 2019; 1 page.
*Zest Labs, Inc.* v *Walmart* ; ECF No. 102-07; Zest Labs, Inc. et al.; "Exhibit G Filed Under Seal"; United States District Court forthe Eastern District of Arkansas; Case No. 4:18-CV-00500-JM; Feb. 20, 2019; 1 page.
*Zest Labs, Inc.* v *Walmart* ; ECF No. 102-08; Williams, Fred I.; "Exhibit H"; United States District Court forthe Eastern District of Arkansas; Case No. 4:18-CV-00500-JM; Feb. 20, 2019; pp. 1-5.
*Zest Labs, Inc.* v *Walmart* ; ECF No. 102-09; Simons, Michael; "Exhibit I"; United States District Court forthe Eastern District of Arkansas; Case No. 4:18-CV-00500-JM; Feb. 20, 2019; pp. 1-8.
*Zest Labs, Inc.* v *Walmart* ; ECF No. 102-10; Williams, Fred I.; "Exhibit J"; United States District Court forthe Eastern District of Arkansas; Case No. 4:18-CV-00500-JM; Feb. 20, 2019; pp. 1-4.
*Zest Labs, Inc.* v *Walmart* ; ECF No. 102-11; Simons, Michael; "Exhibit K"; United States District Court forthe Eastern District of Arkansas; Case No. 4:18-CV-00500-JM; Feb. 20, 2019; pp. 1-2.
*Zest Labs, Inc.* v *Walmart* ; ECF No. 102-12; Tulin, Edward L.; "Exhibit L"; United States District Court forthe Eastern District of Arkansas; Case No. 4:18-CV-00500-JM; Feb. 20, 2019; pp. 1-4.
*Zest Labs, Inc.* v *Walmart* ; ECF No. 102-13; Sammi, P. Anthony; "Exhibit M"; United States District Court forthe Eastern District of Arkansas; Case No. 4:18-CV-00500-JM; Feb. 20, 2019; pp. 1-3.
*Zest Labs, Inc.* v *Walmart* ; ECF No. 102-14; Sammi, P. Anthony; "Exhibit N"; United States District Court forthe Eastern District of Arkansas; Case No. 4:18-CV-00500-JM; Feb. 20, 2019; pp. 1-3.
*Zest Labs, Inc.* v *Walmart* ; ECF No. 102; Zest Labs, Inc. et al.; "Plaintiffs' Motion To Compel Supplemental Responses To Interrogatories and Requests for Production From Defendant"; United States District Court forthe Eastern District of Arkansas; Case No. 4:18-CV-00500-JM; Feb. 20, 2019; pp. 1-6.
*Zest Labs, Inc.* v *Walmart* ; ECF No. 103; Zest Labs, Inc. et al.; "Plaintiffs' Brief in Support of Motion To Compel Supplemental Responses To Interrogatories and Requests for Production From Defendant"; United States District Court forthe Eastern District of Arkansas; Case No. 4:18-CV-00500-JM; Feb. 20, 2019; pp. 1-24.
*Zest Labs, Inc.* v *Walmart* ; ECF No. 105-1; Walmart; "Exhibit A—Filed Under Seal Pursuant To Order Dated Sep. 7, 2018"; United States District Court forthe Eastern District of Arkansas; Case No. 4:18-CV-00500-JM; Feb. 25, 2019; 1 page.

(56) References Cited

OTHER PUBLICATIONS

*Zest Labs, Inc.* v *Walmart* ; ECF No. 105; Walmart; "Defendant'S Response To Plaintiffs' Motion To Compel"; United States District Court for the Eastern District of Arkansas; Case No. 4:18-CV-00500-JM; Feb. 25, 2019; pp. 1-21.
*Zest Labs, Inc.* v *Walmart* ; ECF No. 125; Zest Labs, Inc. et al.; "Plaintiffs' Motion To Compel Defendant Walmart To Comply With the Court's Mar. 6, 2019 Order and Otherwise Produce Technical Discovery"; United States District Court for the Eastern District of Arkansas; Case No. 4:18-CV-00500-JM; Apr. 22, 2019; pp. 1-9.
*Zest Labs, Inc.* v *Walmart* ; ECF No. 126; Zest Labs, Inc. et al.; "Plaintiffs' Brief in Support of Motion To Compel Defendant Walmart To Comply With the Court'S Mar. 6, 2019 Order and Otherwise Produce Technical Discovery"; United States District Court for the Eastern District of Arkansas; Case No. 4:18-CV-00500-JM; Apr. 22, 2019; pp. 1-21.
*Zest Labs, Inc.* v *Walmart* ; ECF No. 130-1; Sammi, P. Anthony; "Zest V. Walmart: Mar. 29, 2019 M. Simons Letter To P. Sammi Re Deficient Production of Technical Documents"; United States District Court for the Eastern District of Arkansas; Case No. 4:18-CV-00500-JM; May 8, 2019; pp. 1-2.
*Zest Labs, Inc.* v *Walmart* ; ECF No. 130-2; Tulin, Edward L; "Zestv. Walmart: Deposition Notices"; United States District Court for the Eastern District of Arkansas; Case No. 4:18-CV-00500-JM; May 8, 2019; pp. 1-2.
*Zest Labs, Inc.* v *Walmart* ; ECF No. 130-3; Simons, Michael; "Zest V. Walmart: Deposition Notices"; United States District Court for the Eastern District of Arkansas; Case No. 4:18-CV-00500-JM; May 8, 2019; pp. 1-3.
*Zest Labs, Inc.* v *Walmart* ; ECF No. 130-4; Walmart; "Exhibit D—Filed Under Seal Pursuant To Order dated Sep. 7, 2018"; United States District Court for the Eastern District of Arkansas; Case No. 4:18-CV-00500-JM; May 8, 2019; 1 page.
*Zest Labs, Inc.* v *Walmart* ; ECF No. 130-5; Simons, Michael; "Zest Labs V. Walmart—Walmart'S Apr. 5, 2019 Production"; United States District Court for the Eastern District of Arkansas; Case No. 4:18-CV-00500-JM; May 8, 2019; pp. 1-2.
*Zest Labs, Inc.* v *Walmart* ; ECF No. 130; Walmart; "Defendant'S Response To Plaintiffs' Motion To Compel Compliance With the Mar. 6, 2019 Order and Technical Discovery"; United States District Court for the Eastern District of Arkansas; Case No. 4:18-CV-00500-JM; May 8, 2019; pp. 1-26.
*Zest Labs, Inc.* v *Walmart* ; ECF No. 131-1; Walmart; "Exhibit A—Filed Under Seal Pursuant To Order dated Sep. 7, 2018"; United States District Court for the Eastern District of Arkansas; Case No. 4:18-CV-00500-JM; May 8, 2019; 1 page.
*Zest Labs, Inc.* v *Walmart* ; ECF No. 131-2; Walmart; "Exhibit B—Filed Under Seal Pursuant To Order dated Sep. 7, 2018"; United States District Court for the Eastern District of Arkansas; Case No. 4:18-CV-00500-JM; May 8, 2019; 1 page.
*Zest Labs, Inc.* v *Walmart* ; ECF No. 131-3; Sammi, P. Anthony; "Re: 4:18-CV-00500-JM Zest Labs Inc et al V. Wal-Mart Inc"; United States District Court for the Eastern District of Arkansas; Case No. 4:18-CV-00500-JM; May 8, 2019; 1 page.
*Zest Labs, Inc.* v *Walmart* ; ECF No. 131-4; Simons, Michael; "Re: 4:18-CV-00500-JM Zest Labs Inc et al V. Wal-Mart Inc"; United States District Court for the Eastern District of Arkansas; Case No. 4:18-CV-00500-JM; May 8, 2019; 1 page.
*Zest Labs, Inc.* v *Walmart* ; ECF No. 131; Walmart; "Defendant'S Sur-Reply Brief in Further Opposition To Plaintiffs' Motion To Compel"; United States District Court for the Eastern District of Arkansas; Case No. 4:18-CV-00500-JM; May 8, 2019; pp. 1-21.
*Zest Labs, Inc.* v *Walmart* ; ECF No. 250; Walmart; "Defendant's Reply Brief in Support of Its Motion To Exclude Proposed Expert Testimony of Patent Attorney Q. Todd Dickinson"; United States District Court for the Eastern District of Arkansas; Case No. 4:18-CV-00500-JM; Mar. 27, 2020; pp. 1-13.
*Zest Labs, Inc.* v *Walmart* ; ECF No. 257-1; Walmart; "Defendant's Surreply in Further Opposition To Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-168.
*Zest Labs, Inc.* v *Walmart* ; ECF No. 257-1; Walmart; "Defendant's Surreply in Further Opposition To Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 169-336.
*Zest Labs, Inc.* v *Walmart* ; ECF No. 257-1; Walmart; "Defendant's Surreply in Further Opposition To Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 337-342.
*Zest Labs, Inc.* v *Walmart* ; ECF No. 257; Walmart; "Defendant's Motion for Leave To File Surreply in Further Opposition To Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-3.
*Zest Labs, Inc.* v *Walmart* ; ECF No. 261-1; Blitzer, Rachel R.; "Declaration of Rachel R. Blitzer Regarding Walmart's Surreply in Further Opposition To Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-169.
*Zest Labs, Inc.* v *Walmart* ; ECF No. 261-1; Blitzer, Rachel R.; "Declaration of Rachel R. Blitzer Regarding Walmart's Surreply in Further Opposition To Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 170-337.
*Zest Labs, Inc.* v *Walmart* ; ECF No. 261; Walmart; "Defendant's Surreply in Further Opposition To Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-5.
*Zest Labs, Inc.* v *Walmart* ; ECF No. 262; Walmart; "Brief in Support of Defendant's Motion for Summary Judgment"; United States District Court for the Eastern District of Arkansas; Case No. 4:18-CV-00500-JM; Apr. 21, 2020; pp. 1-54.
*Zest Labs, Inc.* v *Walmart* ; Ecf No. 263; Walmart; "Defendant's Motion To Exclude Certain Proposed Expert Testimony of Mark Lanning"; United States District Court for the Eastern District of Arkansas; Case No. 4:18-CV-00500-JM; Apr. 21, 2020; pp. 1-6.
*Zest Labs, Inc.* v *Walmart* ; ECF No. 264; Walmart; "Brief in Support of Defendant's Motion To Exclude Proposed Expert Testimony of Mark Lanning"; United States District Court for the Eastern District of Arkansas; Case No. 4:18-CV-00500-JM; Apr. 21, 2020; pp. 1-26.
*Zest Labs, Inc.* v *Walmart* ; ECF No. 265; Walmart; "Defendant's Motion To Exclude Testimony of Damages Expert Stephen L. Becker, Ph.D."; United States District Court for the Eastern District of Arkansas; Case No. 4:18-CV-00500-JM; Apr. 21, 2020; pp. 1-7.
*Zest Labs, Inc.* v *Walmart* ; ECF No. 266; Walmart; "Brief in Support of Defendant's Motion To Exclude Testimony of Damages Expert Stephen L. Becker, Ph.D "; United States District Court for the Eastern District of Arkansas; Case No. 4:18-CV-00500-JM; Apr. 21, 2020; pp. 1-22.
*Zest Labs, Inc.* v *Walmart* ; ECF No. 267; Walmart; "Defendant's Response To Zest Labs, Inc.'s Motion for Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-23.
*Zest Labs, Inc.* v *Walmart* ; ECF No. 268; Walmart; "Defendant's Response To Zest Labs, Inc.'s Motion for Partial Summary Judgment That Walmart Used and Disclosed Zest Labs' Information in

(56) References Cited

OTHER PUBLICATIONS the Walmart Applications"; United States District Court for the Eastern District of Arkansas; Case No. 4:18-CV-00500-JM; Apr. 21, 2020; pp. 1-29.
*Zest Labs, Inc.* v *Walmart* ; ECF No. 269; Walmart; "Defendant's Response To Plaintiffs' Motion To Exclude Testimony of Walmart's Damages Expert, Dr. William Choi"; United States District Court for the Eastern District of Arkansas; Case No. 4:18-CV-00500-JM; Apr. 21, 2020; pp. 1-17.
*Zest Labs, Inc.* v *Walmart* ; ECF No. 270; Walmart; "Defendant's Response To Plaintiffs' Motion To Exclude Testimony of Walmart's Technical Expert, Dr. David Dobkin, Ph.D."; United States District Court for the Eastern District of Arkansas; Case No. 4:18-CV-00500-JM; Apr. 21, 2020; pp. 1-13.
*Zest Labs, Inc.* v *Walmart* ; ECF No. 271; Walmart; "Defendant's Response To Plaintiffs' Motion To Exclude Testimony of Walmart's Technical Expert, Dr. Catherine Adams Hutt, Ph.D."; United States District Court for the Eastern District of Arkansas; Case No. 4:18-CV-00500-JM; Apr. 21, 2020; pp. 1-25.
*Zest Labs, Inc.* v *Walmart* ; ECF No. 272; Walmart; "Defendant's Reply Brief in Support of Its Motion To Exclude Testimony of Damages Expert Stephen L. Becker, Ph.D."; United States District Court for the Eastern District of Arkansas; Case No. 4:18-CV-00500-JM; Apr. 21, 2020; pp. 1-22.
*Zest Labs, Inc.* v *Walmart* ; ECF No. 273; Walmart; "Defendant's Reply Brief in Support of Its Motion for Summary Judgment"; United States District Court for the Eastern District of Arkansas; Case No. 4:18-CV-00500-JM; Apr. 21, 2020; pp. 1-56.
*Zest Labs, Inc.* v *Walmart* ; ECF No. 274; Walmart; "Defendant's Reply Brief in Support of Its Motion To Exclude Proposed Expert Testimony of Mark Lanning"; United States District Court for the Eastern District of Arkansas; Case No. 4:18-CV-00500-JM; Apr. 21, 2020; pp. 1-22.
*Zest Labs, Inc.* v *Walmart* ; ECF No. 275; Zest Labs, Inc. et al.; "Zest Labs Inc.'S Motion for Partial Summary Judgment That Walmart Used and Disclosed Zest's Information in the Walmart Applications"; United States District Court for the Eastern District of Arkansas; Case No. 4:18-CV-00500-JM; Apr. 21, 2020; pp. 1-4.
Zest Labs, Inc. v Walmart; ECF No. 276; Zest Labs, Inc. et al.; "Plaintiffs' Motion To Exclude Testimony of Walmart's Expert, Dr. David p. DOBKIN"; United States District Court for the Eastern District of Arkansas; Case No. 4:18-CV-00500-JM; Apr. 21, 2020; pp. 1-3.
Zest Labs, Inc. v Walmart; ECF No. 277; Zest Labs, Inc. et al.; "Brief in Support of Plaintiffs' Motion To Exclude the Testimony of Walmart's Expert Witness, Dr. David p. DOBKIN"; United States District Court for the Eastern District of Arkansas; Case No. 4:18-CV-00500-JM; Apr. 21, 2020; pp. 1-59.
*Zest Labs, Inc.* v *Walmart* ; ECF No. 278; Zest Labs, Inc. et al.; "Plaintiffs' Motion To Exclude Testimony of Walmart Expert, Dr. Catherine Adams Hutt"; United States District Court for the Eastern District of Arkansas; Case No. 4:18-CV-00500-JM; Apr. 21, 2020; pp. 1-4.
*Zest Labs, Inc.* v *Walmart* ; ECF No. 279; Zest Labs, Inc. et al.; "Brief in Support of Plaintiffs' Motion To Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-64.
*Zest Labs, Inc.* v *Walmart* ; ECF No. 280; Zest Labs, Inc. et al.; "Zest Labs Inc.'S Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-4.
*Zest Labs, Inc.* v *Walmart* ; ECF No. 281; Zest Labs, Inc. et al.; "Plaintiffs' Motion To Exclude Testimony of Walmart's Damages Expert, Dr. William Choi"; United States District Court for the Eastern District of Arkansas; Case No. 4:18-CV-00500-JM; Apr. 21, 2020; pp. 1-4.

*Zest Labs, Inc.* v *Walmart* ; ECF No. 282; Zest Labs, Inc. et al.; "Plaintiffs' Brief in Support of Motion To Exclude Testimony of Walmart's Damages Expert, Dr. William Choi"; United States District Court for the Eastern District of Arkansas; Case No. 4:18-CV-00500-JM; Apr. 21, 2020; pp. 1-30.
*Zest Labs, Inc.* v *Walmart* ; ECF No. 283; Zest Labs, Inc. et al.; "Zest Labs Inc.'S Brief in Support of Its Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-159.
*Zest Labs, Inc.* v *Walmart* ; ECF No. 284; Zest Labs, Inc. et al.; "Zest Labs Inc.'S Brief in Support of Its Motion for Partial Summary Judgment That Walmart Used and Disclosed Zest Labs' Information in the Walmart Applications"; United States District Court for the Eastern District of Arkansas; Case No. 4:18-CV-00500-JM; Apr. 21, 2020; pp. 1-165.
*Zest Labs, Inc.* v *Walmart* ; ECF No. 285; Zest Labs, Inc. et al.; "Zest Labs Inc.'S Motion for Summary Judgment On Its Claim for Breach of Contract"; United States District Court for the Eastern District of Arkansas; Case No. 4:18-CV-00500-JM; Apr. 21, 2020; pp. 1-3.
*Zest Labs, Inc.* v *Walmart* ; ECF No. 286; Zest Labs, Inc. et al.; "Zest Labs Inc.'S Brief in Support of Its Motion for Summary Judgment On Its Claim for Breach of Contract"; United States District Court for the Eastern District of Arkansas; Case No. 4:18-CV-00500-JM; Apr. 21, 2020; pp. 1-30.
*Zest Labs, Inc.* v *Walmart* ; ECF No. 287; Zest Labs, Inc. et al.; "Plaintiffs' Response To Defendant's Motion for Summary Judgment"; United States District Court for the Eastern District of Arkansas; Case No. 4:18-CV-00500-JM; Apr. 21, 2020; pp. 1-138.
*Zest Labs, Inc.* v *Walmart* ; ECF No. 288; Zest Labs, Inc. et al.; "Plaintiffs' Opposition To Defendant's Motion To Exclude Testimony of Damages Expert Stephen L. Becker, Ph.D."; United States District Court for the Eastern District of Arkansas; Case No. 4:18-CV-00500-JM; Apr. 21, 2020; pp. 1-63.
*Zest Labs, Inc.* v *Walmart* ; ECF No. 289; Zest Labs, Inc. et al.; "Plaintiffs' Brief in Opposition of Defendant's Motion To Exclude Proposed Expert Testimony of Patent Attorney Q. Todd Dickinson"; United States District Court for the Eastern District of Arkansas; Case No. 4:18-CV-00500-JM; Apr. 21, 2020; pp. 1-180.
*Zest Labs, Inc.* v *Walmart* ; ECF No. 290; Zest Labs, Inc. et al.; "Plaintiffs' Brief in Opposition of Defendant's Motion To Exclude Proposed Expert Testimony of Mark Lanning"; United States District Court for the Eastern District of Arkansas; Case No. 4:18-CV-00500-JM; Apr. 21, 2020; pp. 1-62.
*Zest Labs, Inc.* v *Walmart* ; ECF No. 291; Zest Labs, Inc. et al.; "Zest Labs Inc.'S Reply Brief in Support of Its Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-18.
*Zest Labs, Inc.* v *Walmart* ; ECF No. 292; Zest Labs, Inc. et al.; "Plaintiffs' Reply in Support of Their Motion To Exclude Testimony of Walmart's Damages Expert Dr. William Choi"; United States District Court for the Eastern District of Arkansas; Case No. 4:18-CV-00500-JM; Apr. 21, 2020; pp. 1-20.
*Zest Labs, Inc.* v *Walmart* ; ECF No. 293; Zest Labs, Inc. et al.; "Brief in Support of Plaintiffs' Motion To Exclude the Testimony of Walmart's Expert Witness, Dr. David P. Dobkin"; United States District Court for the Eastern District of Arkansas; Case No. 4:18-CV-00500-JM; Apr. 21, 2020; pp. 1-13.
*Zest Labs, Inc.* v *Walmart* ; ECF No. 294; Zest Labs, Inc. et al.; "Zest Labs Inc.'S Reply in Support of Their Motion for Partial Summary Judgment That Walmart Used and Disclosed Zest's Information in the Walmart Application"; United States District Court for the Eastern District of Arkansas; Case No. 4:18-CV-00500-JM; Apr. 21, 2020; pp. 1-39.
*Zest Labs, Inc.* v *Walmart* ; ECF No. 295; Zest Labs, Inc. et al.; "Plaintiffs' Reply in Support of Their Motion To Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-23.

(56) References Cited

OTHER PUBLICATIONS

*Zest Labs, Inc.* v *Walmart* ; ECF No. 296; Zest Labs, Inc. et al.; "Plaintiffs' Objections To and Motion To Strike Evidence Cited in Walmart's Responses To Zest Labs, Inc.'S Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart* ; ECF No. 297; Zest Labs, Inc. et al.; "Plaintiffs' Memorandum in Support of Objections To and Motion To Strike Evidence Cited in Walmart's Responses To Zest Labs, Inc.'S Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart* ; ECF No. 298; Walmart; "Defendant's Consolidated Brief in Opposition To Plaintiffs' Objections To and Motions To Strike Evidence Cited By Walmart in Connection With Summary Judgment Motions (DktS. 222 & 248)"; United States District Court for the Eastern District of Arkansas; Case No. 4:18-CV-00500-JM; May 4, 2020; pp. 1-18.
*Zest Labs, Inc.* v *Walmart* ; Kunin, Stephen G.; "Rebuttal Expert Report of Stephen G. Kunin"; United States District Court for the Eastern District of Arkansas; Case No. 4:18-CV-00500-JM; Nov. 25, 2019; pp. 1-38.
*Zest Labs, Inc.* v *Walmart* ; Zest Labs, Inc. et al.; "Complaint"; United States District Court for the Eastern District of Arkansas; Case No. 4:18-CV-00500-JM; Aug. 1, 2018; pp. 1-26.
Zest Labs; "Blockchain for Supply Chains"; https://www.zestlabs.com/challenges/blockchain-for-supply-chains/; Available as early as Jul. 18, 2019; pp. 1-4.
Zest Labs; "Food Safety and the Supply Chain"; https://www.zestlabs.com/challenges/food-safety/; Available as early as Jul. 18, 2019; pp. 1-5.
Zest Labs; "Food Supplier Operational Efficiency"; https://www.zestlabs.com/challenges/food-supplier-operational-efficiency/; Available as early as Jul. 18, 2019; pp. 1-5.
Zest Labs; "Food Waste is a Significant Problem"; https://www.zestlabs.com/challenges/food-waste-challenge/; Available as early as Jul. 18, 2019; pp. 1-6.
Zest Labs; "Fresh Food Supply Chain"; https://www.zestlabs.com/challenges/fresh-food-supply-chain/; Available as early as Jul. 18, 2019; pp. 1-5.
Zest Labs; "Fresh Food Sustainability"; https://www.zestlabs.com/challenges/fresh-food-sustainability/; Available as early as Jul. 18, 2019; pp. 1-4.
Zest Labs; "Fresh Produce"; http://www.zestlabs.com/fresh-produce; Available as early as Oct. 21, 2017; pp. 1-14.
Zest Labs; "On-Demand Delivery"; https://www.zestlabs.com/on-demand-delivery/; Available as early as Oct. 22, 2017; pp. 1-7.
Zest Labs; "On-demand meal quality visibility from the restaurant to consumer delivery"; https://www.zestlabs.com/zest-delivery/; Available as early as Oct. 22, 2017; pp. 1-7.
Zest Labs; "Post-Harvest Technology"; https://www.zestlabs.com/challenges/post-harvest-technology/; Available as early as Jul. 18, 2019; pp. 1-8.
Zest Labs; "The Freshest Produce"; https://www.zestlabs.com/resources; Available as early as May 2, 2018; pp. 1-16.
Zest Labs; "Zest Fresh - Deep Dive"; https://www.zestlabs.com/resources; Available as early as May 2, 2018; pp. 1-15.
Zest Labs; "Zest Fresh Differentiation"; https://www.zestlabs.com/zest-fresh-differentiation/; Available as early as Jul. 18, 2019; pp. 1-6.
Zest Labs; "Zest Fresh for Beef, Poultry, Pork and Seafood"; https://www.zestlabs.com/zest-fresh-for-protein/; Available as early as Jul. 18, 2019; pp. 1-5.
Zest Labs; "Zest Fresh for Grocers"; https://www.zestlabs.com/zest-fresh-for-produce-for-grocers/; Available as early as Jul. 18, 2019; pp. 1-13.
Zest Labs; "Zest Fresh for Growers, Packers, and Shippers"; https://www.zestlabs.com/zest-fresh-for-growers-and-suppliers/; Available as early as Jul. 18, 2019; pp. 1-17.
Zest Labs; "Zest Fresh for Growers, Retailers and Restaurants"; https://www.zestlabs.com/zest-fresh-for-produce/; Available at least as early as Feb. 7, 2019; pp. 1-7.
Zest Labs; "Zest Fresh for Restaurants"; https://www.zestlabs.com/zest-fresh-for-produce-for-restaurants/; Available as early as Jul. 18, 2019; pp. 1-13.
Zest Labs; "Zest Fresh Grower Testimonial"; https://www.zestlabs.com/resources; Available as early as May 2, 2018; pp. 1-13.
Zest Labs; "Zest Fresh Overview"; https://www.zestlabs.com/resources; Available as early as May 2, 2018; pp. 1-19.
Zest Labs; "Zest Fresh Use Cases"; https://www.zestlabs.com/zest-fresh-use-cases/; Available as early as Jul. 18. 2019; pp. 1-6.
Zest Labs; "Zest Fresh: Pallet-level Quality Management from Harvest to Store"; http://www.zestlabs.com/zest-fresh; Available as early as Oct. 29, 2017; pp. 1-10.
Zest Labs; "Zest Labs Overview"; https://www.zestlabs.com/resources; Available as early as Aug. 1, 2018; pp. 1-13.
Zest Labs;". . . Not Worth a Thousand Words—Why Traditional Temperature Loggers and Imaging Technologies are Inadequate to Determine Freshness and Reduce Waste"; https://www.zestlabs.com/wp-content/uploads/2018/03/WP-05-0318-Not-Worth-A-Thousand-Words.pdf; Mar. 5, 2018; pp. 1-6.
Zest Labs; "10 Limitations of Traditional Temperature Data Loggers And Why They're No. Longer Adequate for the Cold Chain"; https://www.zestlabs.com/wp-content/uploads/2018/05/PB-04-0418-10-Limitations-of-Data-Loggers.pdf; May 4, 2018; pp. 1-3.
Zest Labs; "Before and After—The Benefits of Digital Transformation in the Fresh Food Supply Chain"; https://www.zestlabs.com/downloads/Before-and-After-Digital-Transformation.pdf; Jan. 13, 2019; pp. 1-6.
Zest Labs; "Blockchain and Achieving True Transparency—Proactively Managing Food Safety and Freshness with Blockchain and IoT Technologies"; https://www.zestlabs.com/wp-content/uploads/2018/01/WP-08-0118.Blockchain.and_.Achieving.True_.Transparency-1.pdf; Jan. 8, 2018; pp. 1-4.
Zest Labs; "Blockchain and Its Value to Suppliers"; https://www.zestlabs.com/downloads/Blockchain-and-lts-Value-to-Suppliers.pdf; Available as early as Jul. 18, 2019; pp. 1-5.
Zest Labs; "Comparing Pallet—and Trailer-level Temperature Monitoring—Implications on Quality, Freshness, Traceability and Profitability for Retail Grocers"; https://www.zestlabs.com/wp-content/uploads/2018/03/WP-04-0318-Pallet-vs-Trailer.pdf; Mar. 4, 2018; pp. 1-4.
Zest Labs; "Freshness Baseline Study—Sample Report"; http://www.zestlabs.com/wp-content/uploads/2018/03/Zest-Labs-Sample-Baseline-Report.pdf; Available as early as Mar. 2018; pp. 1-11.
Zest Labs; "Freshness Myths—False Beliefs That Lead to Food Waste"; https://www.zestlabs.com/downloads/Freshness-Myths.pdf; Aug. 7, 2018; pp. 1-5.
Zest Labs; "Half-bad Is Not Good"; https://www.zestlabs.com/downloads/Grocery-Store-Variability.pdf; Jun. 15, 2019; pp. 1-11.
Zest Labs; "Improve Operational Efficiency—Optimize Labor and Process Adherence to Reduce Costs"; https://www.zestlabs.com/downloads/lmproving-Operational-Efficiency.pdf; Available as early as Jul. 18, 2019; pp. 1-3.
Zest Labs; "Improving Quality and Profitability for Retail Grocers—The Benefits of Pallet-level Monitoring forthe Fresh and Perishable Food Cold Chain"; https://www.zestlabs.com/wp-content/uploads/2017/12/WP-01-1117.Improving.Quality.and_.Profitability.for.Retail.Grocers.pdf; Nov. 1, 2017; pp. 1-8.
Zest Labs; "Let's Start at the Beginning—Reducing Shrink Begins at Harvest"; https://www.zestlabs.com/wp-content/uploads/2018/05/WP-12-0518-Lets-Start-at-the-Beginning.pdf; May 12, 2018; pp. 1-4.
Zest Labs; "Margins Matter—Reducing Fresh Food Waste to Improve Product Margins by 6% or More"; https://www.zestlabs.com/wp-content/uploads/2018/04/WP-11-0418-Margins-Matter-1.pdf; Apr. 11, 2018; pp. 1-6.

(56) References Cited

OTHER PUBLICATIONS

Zest Labs; "Measuring and Managing Operational Efficiency for Growers and Suppliers"; https://www.zestlabs.com/downloads/Zest-Fresh-Metrics-Datasheet.pdf; Aug. 25, 2019; pp. 1-5.

Zest Labs; "Monitoring the Safety and Quality of Fresh, Frozen and Processed Foods"; https://www.zestlabs.com/wp-content/uploads/2016/03/IN-SB-FreshProduce_RestaurantFoodService_031016.pdf; Mar. 10, 2016; pp. 1-2.

Zest Labs; "Pallet-level Quality Management from Harvest to Store"; https://www.zestlabs.com/wp-content/uploads/2016/03/IN_SB_Foodindustry_ProduceGrowers_031016.pdf; Mar. 10, 2016; pp. 1-2.

Zest Labs; "Poor Customer Experiences—Half-Bad is Not Good! A Shelf-Life Variability Study"; https://www.zestlabs.com/downloads/Variability-Infographic.pdf; Available as early as Jul. 2019; pp. 1-1.

Zest Labs; "Proactive Freshness Management: Modernizing the Fresh Food Supply Chain to Reduce Waste and Improve Profitability"; https://www.zestlabs.com/downloads/Proactive-Freshness-Management.pdf; Feb. 6, 2019; pp. 1-7.

Zest Labs; "Reduce Shrink, Improve Profitability and Quality for Fresh Food"; https://www.zestlabs.com/wp-content/uploads/2016/03/IN-SB-FreshProduce_RetailGrocers_031016.pdf; Mar. 10, 2016; pp. 1-3.

Zest Labs; "Shelf-life Variability Begins in the Field—Produce Pallets Harvested on the Same Day Vary by as Much as 86 Percent, Contributing to Shrink and Lost Profits"; https://www.zestlabs.com/wp-content/uploads/2018/02/WP-10-0218-Shelf-life-Variability.pdf; Feb. 10, 2018; pp. 1-4.

Zest Labs; "Strawberries—Shelf-Life Variability"; https://www.zestlabs.com/downloads/Zest-Fresh-Strawberries-Report.pdf; Available as early as Jul. 2019; pp. 1-2.

Zest Labs; "The Best of Zest 2018—A Collection of Our Most Popular Blogs"; https://www.zestlabs.com/downloads/The-Best-of-Zest-2018.pdf; Available as early as 2018; pp. 1-15.

Zest Labs; "The ZIPR Code Freshness Metric—Dynamically providing the current freshness of each pallet to help you intelligently manage product and reduce shrink throughout the fresh food supply chain"; https://www.zestlabs.com/downloads/The-ZIPR-Code.pdf; Jun. 1, 2018; pp. 1-3.

Zest Labs; "Today, You Saved $67,571—How Zest Fresh for Managing the Produce Cold Chain Reduces Waste and Saves Retailers Money . . . Beginning on Day One"; https://www.zestlabs.com/downloads/Today-You-Saved.pdf; Jun. 3, 2018; pp. 1-6.

Zest Labs; "True Transparency for Freshness Management, Food Safety, Authenticity and Traceability"; https://www.zestlabs.com/wp-content/uploads/2018/03/SO-04-0218-Zest-Fresh-for-Protein-Solution-Overview.pdf; Feb. 4, 2018; pp. 1-2.

Zest Labs; "Zest Labs FAQ and Reference Guide"; https://www.zestlabs.com/downloads/Zest-Labs-FAQ-and-Reference-Guide.pdf; Jul. 1, 2018; pp. 1-6.

Zest Labs; "Zest Labs Professional Services"; https://www.zestlabs.com/wp-content/uploads/2018/03/SO-05-0318-Zest-Labs-Professional-Services.pdf; Mar. 5, 2018; pp. 1-2.

\* cited by examiner

SYSTEM AND METHOD FOR PRODUCE DETECTION AND CLASSIFICATION

PRIORITY

The present disclosure claims priority to Indian Provisional Patent Application 201811028178, filed Jul. 26, 2018, and U.S. Provisional patent application 62/773,756, filed Nov. 30, 2018, the contents of which are incorporated herein in their entirety.

BACKGROUND

1. Technical Field

The present disclosure relates to object detection, and more specifically to object detection on produce using a combination of multiple classification models.

2. Introduction

Currently, inspecting fruit, vegetables, and other produce for grocery stores requires human beings to manually inspect the produce to verify the quality. For example, as produce is received at a Grocery Distribution Center (GDC), Quality Check (QC) associates inspect the freshness and quality of all produce received, thereby allowing the associates the ability to accept or reject an inbound shipment before it is distributed to the retail locations. This inspection process involves a complete manual inspection executed by the QC associate with the results recorded in a computer system. Each produce category has a set of standardized rules for the quality check, with different types of possible defects which the associate needs to look for and, if the defects are found, which need to be documented.

For example, inspection of strawberries requires (1) selecting and opening of a clamshell (an individual package of strawberries) from a shipped case of multiple strawberry clamshells; (2) counting and recording number of strawberries present in the individual clamshell; (3) inspecting for any defective strawberries; (4) recording the amount and severity of the defects identified; and (5) taking/recording pictures of the defective strawberries as evidence.

During the inspection of produce, an average 50% of the time is spent on counting the produce and defect identification. This manual process is prone to human errors and biased inspection results (depending on the experience, perspective and training of a QC associate). This adds delay in GDC processing time, prolonging the time to reach stores, and thus reduces shelf life of the produce.

Technical Problem

How to combine feature sets of different deep learning architectures used in image processing to enhance object detection and defect classification.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method performed according to the concepts disclosed herein can include: receiving, at a processor, an image of an item; performing, via the processor using a first pre-trained neural network, feature detection on the image, resulting in a first feature map of the image; concatenating the first feature map, resulting in a first concatenated feature map; performing, via the processor using a second pre-trained neural network, feature detection on the image, resulting in a second feature map of the image; concatenating the second feature map, resulting in a second concatenated feature map; combining the first concatenated feature map and the second concatenated feature map, resulting in a combined feature map; performing, via the processor using a third pre-trained neural network, feature detection on the combined feature map, resulting in tiered neural network features; and classifying, via the processor, the item based on the tiered neural network features.

An exemplary system configured according to the concepts disclosed herein can include: a processor; and a computer-readable storage medium having instructions stored which, when executed by the processor, cause the processor to perform operations such as: receiving an image of an item; performing, using a first pre-trained neural network, feature detection on the image, resulting in a first feature map of the image; concatenating the first feature map, resulting in a first concatenated feature map; performing, using a second pre-trained neural network, feature detection on the image, resulting in a second feature map of the image; concatenating the second feature map, resulting in a second concatenated feature map; combining the first concatenated feature map and the second concatenated feature map, resulting in a combined feature map; performing, using a third pre-trained neural network, feature detection on the combined feature map, resulting in tiered neural network features; and classifying the item based on the tiered neural network features.

An exemplary non-transitory computer-readable storage medium configured as disclosed herein can have instructions stored which, when executed by a processor, cause the processor to perform operations which can include: receiving an image of an item; performing, using a first pre-trained neural network, feature detection on the image, resulting in a first feature map of the image; concatenating the first feature map, resulting in a first concatenated feature map; performing, using a second pre-trained neural network, feature detection on the image, resulting in a second feature map of the image; concatenating the second feature map, resulting in a second concatenated feature map; combining the first concatenated feature map and the second concatenated feature map, resulting in a combined feature map; performing, using a third pre-trained neural network, feature detection on the combined feature map, resulting in tiered neural network features; and classifying the item based on the tiered neural network features.

DETAILED DESCRIPTION

Figure 1:
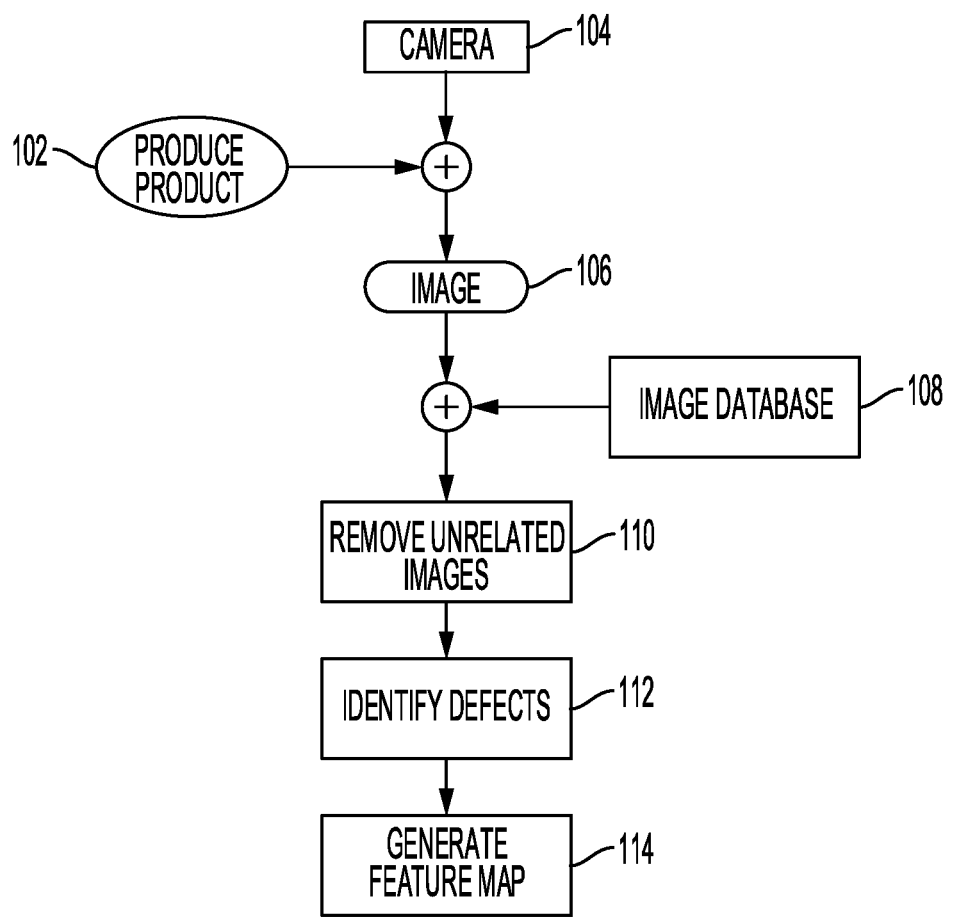
FIG. 1 illustrates exemplary image recognition using a neural network.

Various embodiments of the disclosure are described in detail below. While specific implementations are described, it should be understood that this is done for illustration purposes only. Other components and configurations may be used without parting from the spirit and scope of the disclosure.

Deep Convolution Neural Networks (CNNs) are the state of the art for classifying images. Many deep learning researchers have come up with a variety of different deep learning architectures like VGG (Visual Geometry Group), Resnet, Inception, etc., which can achieve high rates of accuracy. Despite these high rates of accuracy, the need exists to obtain even higher accuracy within image processing and classification. To obtain that higher accuracy, systems configured according to the principles and concepts disclosed herein leverage feature sets generated by distinct model architectures to achieve state of the art performance on our data.

More specifically, systems configured according to this disclosure use a deep learning architecture which achieves a better performance than the other image evaluation tools that are currently available. This is accomplished by combining features from available pre-trained networks, combining and/or concatenating the features identified by those pre-trained networks, and performing additional analysis on the combined/concatenated features to obtained an output which has a higher accuracy than any single pre-trained network alone.

For example, pre-trained networks such as Inception, Densenet, Xception, etc., provide feature maps for data which is input to those networks. By combining the features of the respective feature maps, we can obtain new features which are complementary to the existing features of the original feature maps. In addition, using convolution and dense layers on the combined feature maps, we can further enhance the features, both the features obtained from the original feature maps and those new features identified based on relationships between features found in distinct, original feature maps. By combining different feature sets for data, and specifically images, where the feature sets are received from different deep learning architectures, category-specific defect classification and object detection are enhanced.

While the disclosed solutions can be applied to any combination of distinct neural network architectures, examples provided herein will be primarily directed to image classification and object detection within images. Implementation of the disclosed concepts and principles, when applied to image classification and object detect, improve the accuracy and efficacy of counting and quality detection systems, which can have real-world benefits. For example, by using the disclosed systems and processes in produce detection, correctly identifying defects within the produce as disclosed herein reduces the manpower required to verify the produce quality, thereby allowing faster movement of produce to stores from distribution centers. This will result in maximizing the shelf life of an item, a reduction in the wasted produce, and providing better-quality produce to customers.

As another example of the utility of these concepts, the improved accuracy in detecting defects within produce can be leveraged to train new Quality Center associates with the help of artificial intelligence. As the system gains information and knowledge about what constitutes a defect, the system can improve how it combines, analyzes, and processes the features from the feature maps. More specifically, as feature maps are combined and/or concatenated, the system then inputs those combined/concatenated feature maps into an additional neural network. As the system improves (through the collection of data and identification of relationships), the system can modify this additional neural network, resulting in a dynamic, changing, and constantly improving system for combining the results of distinct neural networks.

The disclosed solutions take advantage of deep learning and computer vision tools to extract the information from inspection image. The process involves two phases—Object Detection and Object Classification.

Regarding object detection, the implementation disclosed herein can use Faster R-CNN (Regional Convolutional Neural Network), a faster version of object detection than object detection performed using traditional object detection on Convolutional Neural Networks (and identified as "Faster R-CNN" because it is faster than the original application of CNNs to object detection, the application of R-CNNs, and the "fast R-CNN" algorithms developed). The Faster R-CNN implementation disclosed herein can use a Caffe2 framework for object detection: that is, the top-left and bottom-right coordinates of the rectangular regions which might contain objects are discovered. The output of the above object detection algorithm is then fed into the object classification.

The object classification can use an ensemble (more than one) of pre-trained, deep convolutional neural networks along with fine-tuned additional layers for classification. The new, ensemble architecture is then trained using a neural network library (such as Keras (a high-level API (Application Programming Interface) used to build and train deep learning models) with a machine learning framework (such as TensorFlow™)). Preferably, the neural network library selected produces models which are modular, composable, user-friendly, and easy to extend into new layers, loss functions, etc. The multiple CNNs respectively produce models based on the object detected, then the models are trained and updated using the neural network library.

The models can be generated a single time for each respective CNN based on the type of object being detected. Thus for strawberries, multiple models can be produced and trained by the respective CNNs using strawberry object detection, then further trained using neural network library, and further augmented using a machine learning framework.

The multiple models can then be combined and compared, resulting in higher rates of correct categorization of the produce. Over time, the models can continue to be refined and augmented. In addition, the weights or values of the models can be modified based on the accuracy, speed, or efficiency of the respective models. For example, if the ensemble of models produced gives five models, and one of the five models produces false positives thirty percent of the time, and the other four models produce false positives less than 20 percent of the time, the model producing the higher number of false positives can be weighted lower when making the ultimate categorization of the system.

Exemplary produce items on which this detection system and the accompanying ensemble characterization system can be used can include: strawberries, multiple varieties of potatoes, tomatoes, lettuce, etc. The disclosed system has been tested on strawberries, using production data of around 20,000 inspected defective strawberries from GDCs (1 year of data). After exploratory data analysis, fifteen different defects were found in strawberries. The top five defects (decay, bruise, discoloration, overripe soft berries and color) accounted for 96% of the defective strawberries. For the classes which had relatively less data, various image augmentation techniques to augment the data. The models produced used machine learning (ML) with GPU (Graphic Processing Unit) capabilities for model training and for exposing these models as APIs. The APIs can then be integrated into distribution center mobile devices (such as TC70s), so the QC associates performing the quality checks can use their mobile devices to automatically (and systematically) identify defects within objects (such as produce) based on quantifiable standards.

This solution helps to reduce the time taken for the quality inspection in a GDC by up to 70%. The advantages of using such a system is that it provides consistency of inspection without any bias, improves the relationship with the suppliers with standardized inspection process, and speeds up the time for on-shelf delivery. This will also let the QC associates use their time more productively on other tasks, such as movement of produce, ripeness testing, etc. Additionally, store-level produce associates generally have less average experience/training, and this innovation will empower the associates to become quality inspection specialists through deep learning and computer vision capabilities in a very short time.

To prioritize defects within the image processing, one mechanism which can be implemented is a Pareto analysis, where a particular category is defined to capture the defects which occur 80% (or another predefined percentage) of the time. These percentages can vary from model to model, pre-trained network to pre-trained network, within the ensemble of neural networks which initially analyze the data.

While the concepts disclosed herein are focused on using deep learning/computer vision for object detection and classification to aid in quality inspection, and one use of the disclosed invention is for quality control on produce products, the concepts disclosed herein can be leveraged to automate other similar processes in other systems utilizing neural networks.

Turning to the figures, FIG. 1 illustrates exemplary image recognition using a neural network. In this example, a camera 104 takes a picture of a produce product 102, resulting in an image 106. The image 106 is compared to other images stored in an image database 108, and unrelated images are removed 110. The system identifies defects 112 within the image 106 based on the related images, and generates a feature map 114 of the features within the image 106. While inputs and processing capabilities may differ across different neural networks, one or more portions of this process (such as the comparison to the image database 108, removal of unrelated images 110, identification of defects 112, and generation of feature maps 114) may be incorporated into the neural network.

Figure 2:
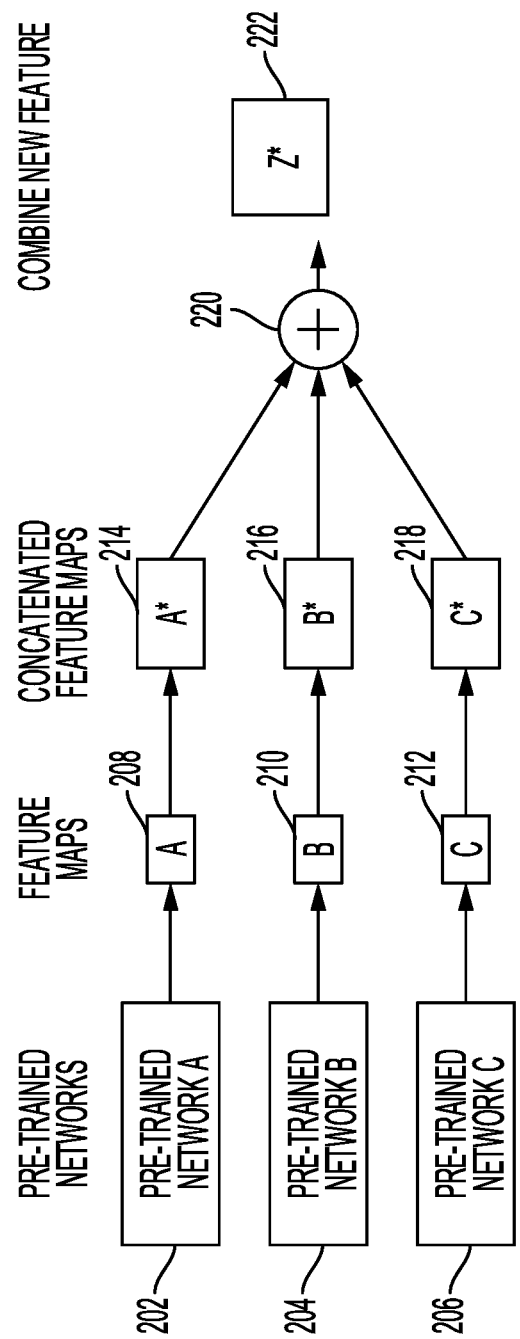
FIG. 2 illustrates a first exemplary concatenation of feature maps from multiple pre-trained networks.

FIG. 2 illustrates a first exemplary concatenation of feature maps from multiple pre-trained networks. In this example there are three pre-trained neural networks 202, 204, 206. Each of these pre-trained neural networks produce a corresponding feature map 208, 210, 212, which are in turn concatenated. These concatenated feature maps 214, 216, 218 are then combined 220. The combined, concatenated feature map 220 is then analyzed/processed to identify additional features 222. These new features 222 were undetected using any individual pre-trained neural network 202, 204, 206, but were detected using the combined results of multiple neural networks. To identify the new features 222, the system can input the combined, concatenated feature map 220 into an additional neural network. This additional neural network can be created based on the specific pre-trained neural networks 202, 204, 206 used in analyzing the initial data.

As an example, an image can be input to multiple pre-trained neural networks 202, 204, 206. Each of those networks 202, 204, 206 produce a respective feature map 208, 210, 212 of the image. The feature maps 208, 210, 212 can identify, for example, objects within the image (such as an apple or strawberry) as well as aspects of those objects (such as a bruise or blemish on fruit). The system concatenates these feature maps (reducing the amount of memory required to store the feature maps to a lower amount) and combines the feature maps together. In some cases, the combination can rely on coordinates built into the feature maps which identify where the various objects and object features are located. These concatenated, combined feature maps are then input to an additional neural network, designed specifically for the pre-trained neural networks 202, 204, 206 initially used to evaluate the image. This additional neural network identifies, based on features within the concatenated, combined feature map, additional features which were missed by each of the original pre-trained neural networks 202, 204, 206. With the features originally identified by the pre-trained neural networks 202, 204, 206, and with the newly identified features identified by the additional neural network, the system can identify and classify the objects within the image. This identification and classification is both more complete and more accurate than any single pre-trained neural networks 202, 204, 206 alone.

Figure 3:
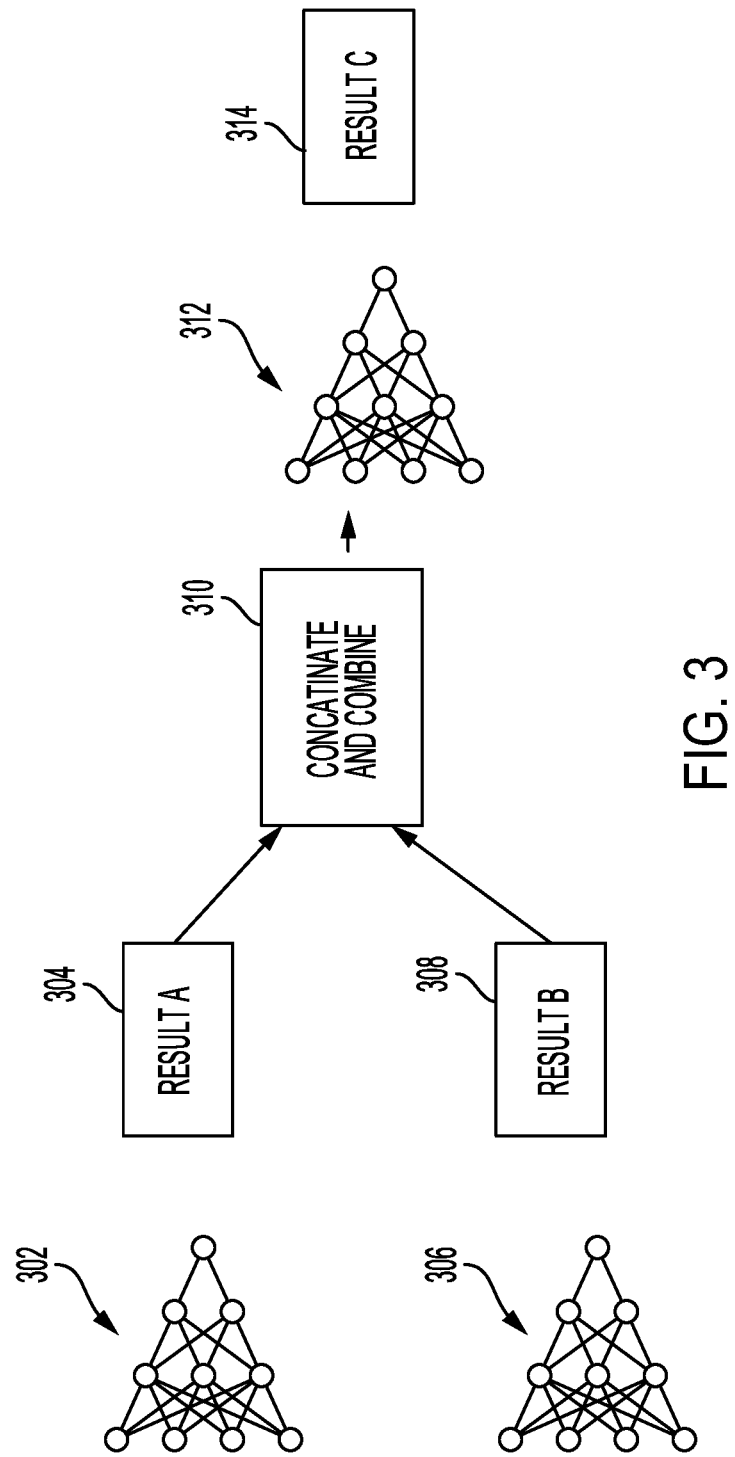
FIG. 3 illustrates a second exemplary concatenation of feature maps from multiple pre-trained networks.

FIG. 3 illustrates a second exemplary concatenation of feature maps from multiple pre-trained networks. In this example, there are two pre-trained neural networks 302, 306, which each produce respective results 304, 308 based on the common inputs provided to the neural networks 302, 306. These results 304, 308 are concatenated and combined 310, then those concatenated, combined results are input into an additional neural network 312. From that additional neural network 312, the system produces new results "Result C" 314, which were not found by either of the two initial neural networks 302, 306. The system can then identify and classify the data being evaluated based on the results 304, 308 of the two initial neural networks 302, 306 as well as the additional result 314 of the additional neural network 312.

Figure 4:
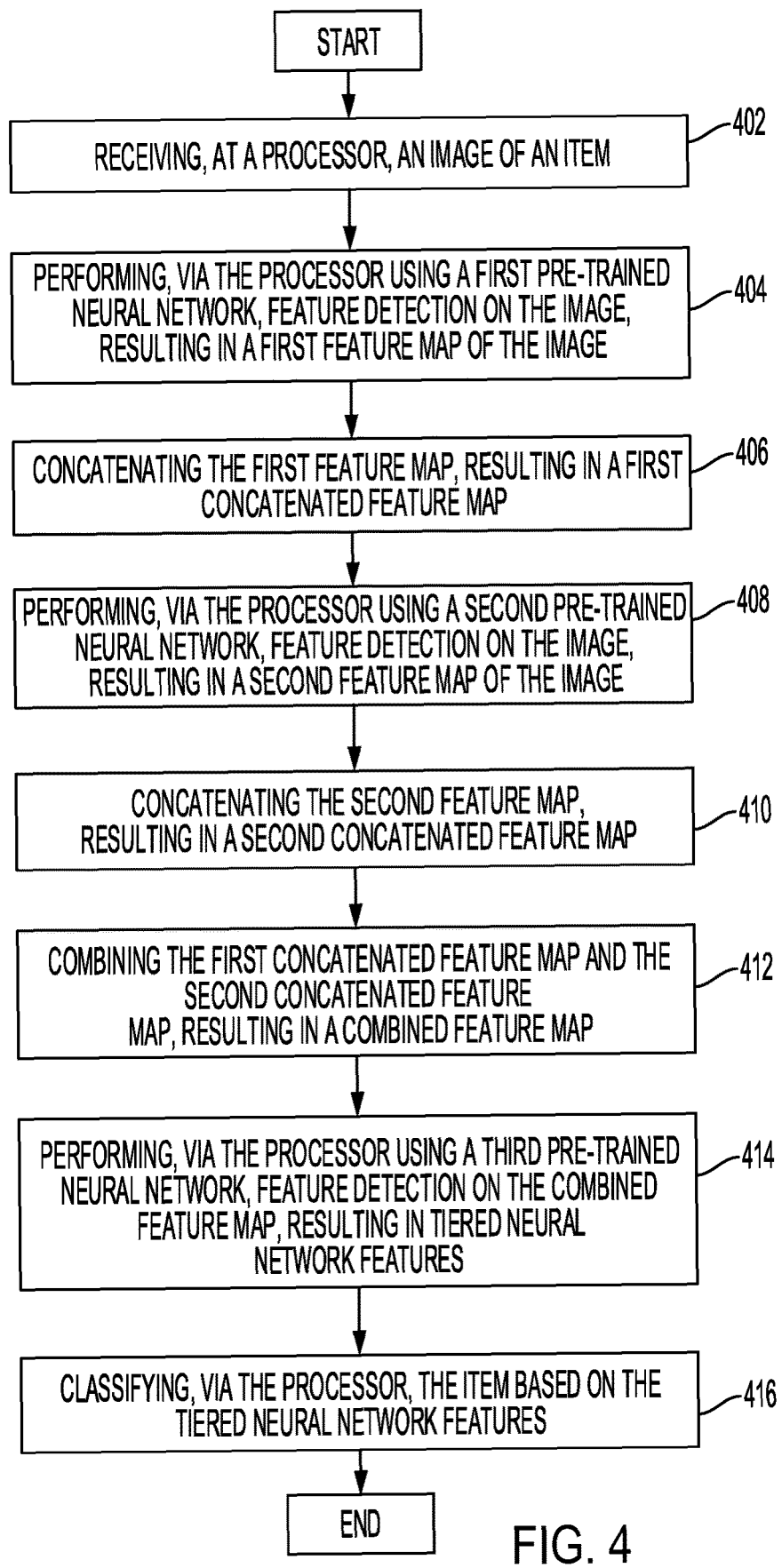
FIG. 4 illustrates an example method claim.

FIG. 4 illustrates an example method claim. In this example, the system receives receiving, at a processor, an image of an item (402). The system then performs, via the processor using a first pre-trained neural network, feature detection on the image, resulting in a first feature map of the image (404), and concatenates the first feature map, resulting in a first concatenated feature map (406). The system also performs, via the processor using a second pre-trained neural network, feature detection on the image, resulting in a second feature map of the image (408), and concatenates the second feature map, resulting in a second concatenated feature map (410). In some configurations, the feature detection using the first and second pre-trained neural networks can occur in parallel, thereby reducing the time required to obtain results. In addition, in some configurations, more than two pre-trained neural networks can be used. The system combines the first concatenated feature map and the second concatenated feature map, resulting in a combined feature map (412), and performs, via the processor using a third pre-trained neural network, feature detection on the combined feature map, resulting in tiered neural network features (414). In some cases, rather than a third "pre-trained" neural network, the third neural network can be generated upon receiving the feature maps from the first and second pre-trained neural networks, with the third neural network being generated specifically to accommodate for known differences between the first pre-trained neural network and the second pre-trained neural network. The system then classifies, via the processor, the item based on the tiered neural network features.

In some configurations, the item can be produce. In such cases, the feature detection can identify defects within the produce.

In some configurations, at least one of the first pre-trained neural network, the second pre-trained neural network, and the third pre-trained neural network is a Faster Regional Convolutional Neural Network. In such cases, the Faster Regional Convolutional Neural Network identifies a top-left coordinate of a rectangular region for each item within the image and a bottom-right coordinate of the rectangular region.

In some configurations, the third pre-trained neural network uses distinct neural links (connections between the nodes of the neural network) than the neural links of the first pre-trained neural network and the second pre-trained neural network.

In some configurations, the processor is a Graphical Processing Unit, rather than a generic processor.

Figure 5:
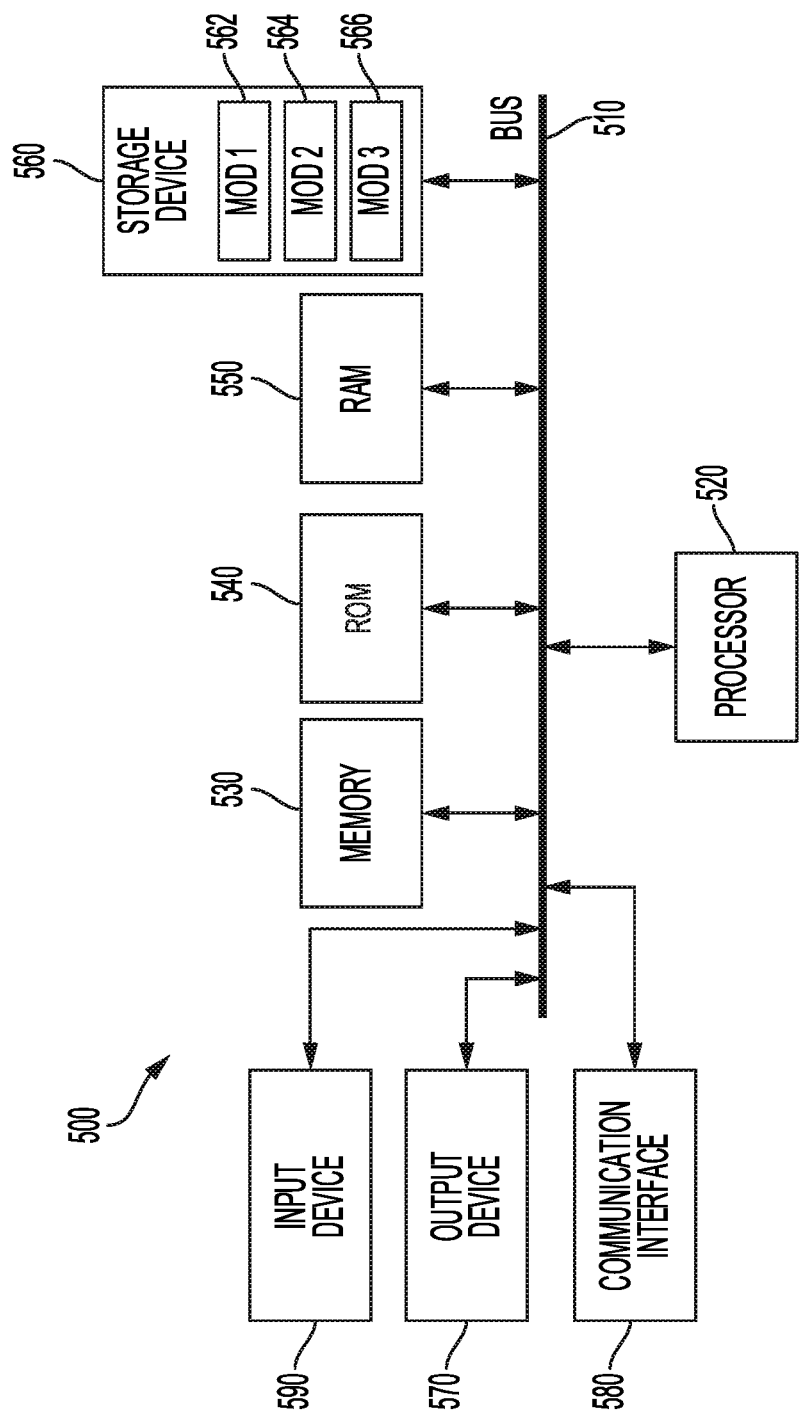
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The steps outlined herein are exemplary and can be implemented in any combination thereof, including combinations that exclude, add, or modify certain steps.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
receiving, at a processor, an image of an item;
performing, via the processor using a first pre-trained neural network, feature detection on the image, resulting in a first feature map of the image;
concatenating the first feature map, resulting in a first concatenated feature map;
performing, via the processor using a second pre-trained neural network, feature detection on the image, resulting in a second feature map of the image;
concatenating the second feature map, resulting in a second concatenated feature map;
combining the first concatenated feature map and the second concatenated feature map, resulting in a combined feature map;
performing, via the processor using a third pre-trained neural network, feature detection on the combined feature map, resulting in tiered neural network features; and
classifying, via the processor, the item based on the tiered neural network features, the classifying including implementing a set of pre-trained neural networks, the set of pre-trained neural networks having been produced based on the tiered neural network features, the classification being a combination of results of the set of pre-trained neural networks, and a result of each pre-trained neural network of the set of pre-trained neural networks being weighted based on a corresponding accuracy.

2. The method of claim 1, wherein the item is produce.

3. The method of claim 2, wherein the feature detection identifies defects within the produce.

4. The method of claim 1, wherein at least one of the first pre-trained neural network, the second pre-trained neural network, and the third pre-trained neural network is a Faster Regional Convolutional Neural Network.

5. The method of claim 4, wherein the Faster Regional Convolutional Neural Network identifies a top-left coordinate of a rectangular region for each item within the image and a bottom-right coordinate of the rectangular region.

6. The method of claim 1, wherein the third pre-trained neural network uses distinct neural links than the neural links of the first pre-trained neural network and the second pre-trained neural network.

7. The method of claim 1, wherein the processor is a Graphical Processing Unit.

8. A system, comprising:
a processor; and a computer-readable storage medium having instructions stored which, when executed by the processor, cause the processor to perform operations comprising:
receiving an image of an item;
performing, using a first pre-trained neural network, feature detection on the image, resulting in a first feature map of the image;
concatenating the first feature map, resulting in a first concatenated feature map;
performing, using a second pre-trained neural network, feature detection on the image, resulting in a second feature map of the image;
concatenating the second feature map, resulting in a second concatenated feature map;
combining the first concatenated feature map and the second concatenated feature map, resulting in a combined feature map;
performing, using a third pre-trained neural network, feature detection on the combined feature map, resulting in tiered neural network features; and
classifying the item based on the tiered neural network features, the classifying including implementing a set of pre-trained neural networks, the set of pre-trained neural networks having been produced based on the tiered neural network features, the classification being a combination of results of the set of pre-trained neural networks, and a result of each pre-trained neural network of the set of pre-trained neural networks being weighted based on a corresponding accuracy.

9. The system of claim 8, wherein the item is produce.

10. The system of claim 9, wherein the feature detection identifies defects within the produce.

11. The system of claim 8, wherein at least one of the first pre-trained neural network, the second pre-trained neural network, and the third pre-trained neural network is a Faster Regional Convolutional Neural Network.

12. The system of claim 11, wherein the Faster Regional Convolutional Neural Network identifies a top-left coordinate of a rectangular region for each item within the image and a bottom-right coordinate of the rectangular region.

13. The system of claim 8, wherein the third pre-trained neural network uses distinct neural links than the neural links of the first pre-trained neural network and the second pre-trained neural network.

14. The system of claim 8, wherein the processor is a Graphical Processing Unit.

15. A non-transitory computer-readable storage medium having instructions stored which, when executed by a computing device, cause the computing device to perform operations comprising:
receiving an image of an item;
performing, using a first pre-trained neural network, feature detection on the image, resulting in a first feature map of the image;
concatenating the first feature map, resulting in a first concatenated feature map;
performing, using a second pre-trained neural network, feature detection on the image, resulting in a second feature map of the image;
concatenating the second feature map, resulting in a second concatenated feature map;
combining the first concatenated feature map and the second concatenated feature map, resulting in a combined feature map;
performing, using a third pre-trained neural network, feature detection on the combined feature map, resulting in tiered neural network features; and
classifying the item based on the tiered neural network features, the classifying including implementing a set of pre-trained neural networks, the set of pre-trained neural networks having been produced based on the tiered neural network features, the classification being a combination of results of the set of pre-trained neural networks, and a result of each pre-trained neural network of the set of pre-trained neural networks being weighted based on a corresponding accuracy.

16. The non-transitory computer-readable storage medium of claim 15, wherein the item is produce.

17. The non-transitory computer-readable storage medium of claim 16, wherein the feature detection identifies defects within the produce.

18. The non-transitory computer-readable storage medium of claim 15, wherein at least one of the first pre-trained neural network, the second pre-trained neural network, and the third pre-trained neural network is a Faster Regional Convolutional Neural Network.

19. The non-transitory computer-readable storage medium of claim 18, wherein the Faster Regional Convolutional Neural Network identifies a top-left coordinate of a rectangular region for each item within the image and a bottom-right coordinate of the rectangular region.

20. The non-transitory computer-readable storage medium of claim 15, wherein the third pre-trained neural network uses distinct neural links than the neural links of the first pre-trained neural network and the second pre-trained neural network.

\* \* \* \* \*